US012616986B2

(12) United States Patent
Sakata et al.

(10) Patent No.: US 12,616,986 B2
(45) Date of Patent: May 5, 2026

(54) TRIGGER-TYPE LIQUID SPRAYER

(71) Applicant: YOSHINO KOGYOSHO CO., LTD., Tokyo (JP)

(72) Inventors: Kota Sakata, Tokyo (JP); Shigeru Hayakawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 163 days.

(21) Appl. No.: 18/687,087

(22) PCT Filed: Aug. 30, 2022

(86) PCT No.: PCT/JP2022/032555
§ 371 (c)(1),
(2) Date: Feb. 27, 2024

(87) PCT Pub. No.: WO2023/032966
PCT Pub. Date: Mar. 9, 2023

(65) Prior Publication Data

US 2024/0367189 A1 Nov. 7, 2024

(30) Foreign Application Priority Data

Aug. 31, 2021 (JP) ................................ 2021-141394
Feb. 28, 2022 (JP) ................................ 2022-029561

(51) Int. Cl.
*B05B 11/00* (2023.01)
*B05B 11/10* (2023.01)

(52) U.S. Cl.
CPC ...... *B05B 11/0059* (2013.01); *B05B 11/0044* (2018.08); *B05B 11/1011* (2023.01); *B05B 11/1038* (2023.01); *B05B 11/1045* (2023.01)

(58) Field of Classification Search
CPC ............ B05B 11/0059; B05B 11/0044; B05B 11/1011; B05B 11/1038; B05B 11/1045; B05B 11/008; F04B 9/14
See application file for complete search history.

(56) References Cited

U.S. PATENT DOCUMENTS 4,273,257 A 6/1981 Smith et al.
6,293,441 B1 * 9/2001 Tasaki ................ B05B 11/0059
222/376

(Continued)

FOREIGN PATENT DOCUMENTS

CN 101249481 A 8/2008
CN 107107086 A 8/2017

(Continued)

OTHER PUBLICATIONS

Aug. 13, 2025 Office Action issued in Chinese Patent Application No. 202280057971.2.

(Continued)

*Primary Examiner* — Vishal Pancholi
(74) *Attorney, Agent, or Firm* — Oliff PLC

(57) ABSTRACT

A trigger-type liquid sprayer including a sprayer body mounted on a container body, a nozzle member having a spray hole, and an invertible adapter. The sprayer body includes a longitudinal supply cylinder part, a trigger mechanism having a trigger part, a storage cylinder, and a storage plunger. The invertible adapter includes an adapter main body configured to form a first and second space, the first space configured to bring the container body in communication with an inside of the longitudinal supply cylinder part through an upright introduction port, and the second space configured to bring an inside of the container body in communication with the first space through an inverted introduction port, and a changeover valve configured to block communication between the first and second spaces (Continued)

when the container body is upright and bring the first and second spaces in communication with each other when the container body is inverted.

8 Claims, 7 Drawing Sheets

(56) References Cited

U.S. PATENT DOCUMENTS

| | | | |
|---|---|---|---|
| 2017/0333931 A1 | 11/2017 | Fujiwara et al. | |
| 2017/0348716 A1* | 12/2017 | Fujiwara | B05B 11/105 |
| 2018/0369842 A1 | 12/2018 | Kakuta | |
| 2020/0030829 A1 | 1/2020 | Kakuta | |

FOREIGN PATENT DOCUMENTS

| | | | |
|---|---|---|---|
| CN | 110536756 | A | 12/2019 |
| CN | 112004755 | A | 11/2020 |
| EP | 3 805 127 | A1 | 4/2021 |
| JP | H09-75800 | A | 3/1997 |
| JP | 2000-070784 | A | 3/2000 |
| JP | 2001-137749 | A | 5/2001 |
| JP | 2014-148330 | A | 8/2014 |
| JP | 2017-114543 | A | 6/2017 |
| JP | 2017-213497 | A | 12/2017 |
| JP | 2018-176114 | A | 11/2018 |
| JP | 2019-131259 | A | 8/2019 |
| JP | 2019-210000 | A | 12/2019 |
| JP | 2020-069430 | A | 5/2020 |
| JP | 2021-007901 | A | 1/2021 |

OTHER PUBLICATIONS

Oct. 18, 2022 International Search Report issued in International Patent Application No. PCT/JP2022/032555.

Jan. 5, 2026 Search Report issued in European Patent Application No. 22864548.7.

* cited by examiner

TRIGGER-TYPE LIQUID SPRAYER

TECHNICAL FIELD

The present invention relates to a trigger-type liquid sprayer. The present application is a U S. National Phase Application of PCT/JP2022/032555 filed on Aug. 30, 2022, which designates the United States and claims priority to Japanese Patent Application No. 2022-029561, filed Feb. 28, 2022, and Japanese Patent Application No. 2021-141394, filed Aug. 31, 2021, the contents of which are incorporated herein by reference.

BACKGROUND ART

As a trigger-type liquid sprayer, a configuration including a main pump part configured to store a liquid and a trigger part configured to operate the main pump part has been disclosed. According to this configuration, when the trigger part is pulled rearward, the liquid in a cylinder of the main pump part flows toward a spray hole by pressurizing the inside of the cylinder. Accordingly, the liquid is sprayed through the spray hole. Meanwhile, the liquid in a container body flows into the cylinder as the inside of the cylinder is decompressed in a process in which the trigger part is returned forward.

For example, in the following Patent Document 1, a trigger-type liquid sprayer including a storage pump part in addition to a main pump part is disclosed. In such a trigger-type liquid sprayer, while part of the liquid sent out of the main pump part is sprayed through a spray hole according to an operation of a trigger part, part of the liquid is stored in a cylinder of the storage pump part. For this reason, when an operation of the trigger part is stopped, the liquid stored in the cylinder of storage pump part flows toward the spray hole. Accordingly, even in a state in which the trigger part is not operated, the liquid can be sprayed continuously.

In addition, a trigger-type liquid sprayer configured to suck up a liquid from the inside of a container body by an operation of a trigger part and spray the liquid through a spray hole is known. As such a trigger-type liquid sprayer, for example, as disclosed in the following Patent Document 2, a trigger-type liquid sprayer including a sprayer body mounted on a container body in which a liquid is accommodated and a nozzle member having a spray hole configured to spray the liquid is known.

The sprayer body includes a storage cylinder having an inner tube and an outer tube. The storage cylinder is arranged vertically in a container axis direction inside a mounting cap attached to a mouth part of the container body. The inside of the inner tube functions as a connecting passage that allows a longitudinal flow path and a pipe to be communicating. An annular space between the inner tube and the outer tube communicates with the longitudinal flow path via the communication passage. An annular piston is vertically movably disposed in the annular space in an upward biased state.

In the above-mentioned trigger-type liquid sprayer, part of the liquid sprayed from the spray hole is introduced into the annular space from the longitudinal flow path through the communication passage by operating the trigger part and stored in the storage cylinder while pressing the annular piston. Accordingly, even after the operation of the trigger part is performed, the liquid stored in the storage cylinder can be sprayed from the spray hole by an upward biasing force of the annular piston. Accordingly, continuous spraying of the liquid can be performed.

CITATION LIST

Patent Document

[Patent Document 1]
Japanese Unexamined Patent Application, First Publication No. 2017-213497

[Patent Document 2]
Japanese Unexamined Patent Application, First Publication No. 2014-148330

SUMMARY OF INVENTION

Technical Problem

Incidentally, in the trigger-type liquid sprayer capable of continuous spraying as disclosed in the above-mentioned Patent Document 1, a spray operation of the liquid may be required in both an upright posture and an inverted posture of the container body.

In addition, in such a trigger-type liquid sprayer as disclosed in the above-mentioned Patent Document 2, the spray operation of the liquid may be required when both upright and upon inversion. Here, as the trigger-type liquid sprayer that meets these needs, one in which an invertible adapter is provided inside the mounting cap is known. The invertible adapter is an adapter that enables spraying of the liquid inside the container body in either the upright posture or the inverted posture of the container body.

In the trigger-type liquid sprayer capable of performing the continuous spraying disclosed in the above-mentioned Patent Document 2, when the spray of the liquid is performed upon both upright and inversion, the invertible adapter also needs to be installed inside the mounting cap, in addition to the storage cylinder. However, when both the storage cylinder and the invertible adapter are provided, it is necessary to secure a large space in a radial direction, and a cap diameter of the mounting cap becomes large. Accordingly, this results in an increase in the overall size of the trigger-type liquid sprayer, and for example, also tends to reduce operability when operating the trigger part while holding the container body.

In consideration of the above-mentioned circumstances, the present invention is directed to providing a trigger-type liquid sprayer capable of continuous spraying in both an upright posture and an inverted posture, and further, a trigger-type liquid sprayer capable of enabling continuous spraying in both an upright posture and an inverted posture while increase in size of a cap diameter of a mounting cap is curbed.

Solution to Problem

In order to solve the aforementioned problems, the present invention employs the following aspects. A first aspect of the present invention is a trigger-type liquid sprayer including a sprayer body mounted on a container body in which a liquid is accommodated, a nozzle member provided in front of the sprayer body and having a spray hole configured to spray a liquid forward, and an invertible adapter attached to a lower end portion of the sprayer body. In addition, the sprayer body includes a longitudinal supply cylinder part extending in an upward/downward direction, through which a liquid suctioned up from an inside of the container body flows, a trigger mechanism having a trigger part disposed in front of the longitudinal supply cylinder part to be movable rearward in a forward biased state, and configured to cause a liquid to flow toward the spray hole according to rearward movement of the trigger part, a storage cylinder extending in a forward/rearward direction, into which a liquid is supplied according to rearward movement of the trigger part, and a storage plunger configured to be movable rearward through the storage cylinder in a forward biased state according to supply of the liquid into the storage cylinder, and configured to cause the liquid in the storage cylinder to flow toward the spray hole. In addition, the invertible adapter includes an adapter main body configured to form a first space and a second space, the first space configured to allow communication between the container body and an inside of the longitudinal supply cylinder part through an upright introduction port, and the second space configured to allow communication between the inside of the container body and the first space through an inverted introduction port, and a changeover valve configured to, in a state that the sprayer body is mounted on the container body, block communication between the first space and the second space when the container body is upright, and allow communication between the first space and the second space when the container body is inverted.

According to the trigger-type liquid sprayer of the aspect, part of the liquid flowing into the storage cylinder can be sprayed through the spray hole, and part of the liquid can be stored in the storage cylinder. For this reason, even when the trigger part is not being operated, the liquid stored in the storage cylinder can be sprayed by a forward biasing force applied to the storage plunger. Further, according to the trigger-type liquid sprayer of the aspect, by providing the invertible adapter, the liquid can be sprayed irrespective of having an upright posture or an inverted posture. As a result, the liquid can be continuously sprayed in both the upright posture and the inverted posture.

In particular, according to the trigger-type liquid sprayer of the aspect, as the storage cylinder (and the storage plunger) extends in the forward/rearward direction, a volume of the storage cylinder is easily secured while suppressing an increase in size of the trigger-type liquid sprayer in the upward/downward direction.

According to a second aspect of the present invention, in the trigger-type liquid sprayer of the first aspect, the storage cylinder and the storage plunger are provided above the longitudinal supply cylinder part and between the longitudinal supply cylinder part and the nozzle member. According to the trigger-type liquid sprayer of the aspect, when designing the storage cylinder and the storage pump, there is little interference with other components of the trigger-type liquid sprayer. For this reason, a degree of design freedom of the storage cylinder and the storage plunger is improved, and a volume of the storage cylinder is easily secured.

According to a third aspect of the present invention, in the trigger-type liquid sprayer of the first or second aspect, the longitudinal supply cylinder part includes a first facing wall disposed above the adapter main body, and a first fitting cylinder part passing through the first facing wall in the upward/downward direction. In addition, the adapter main body includes a second fitting cylinder part fitted into the first fitting cylinder part to a portion of the first fitting cylinder part located above the first facing wall through a lower end opening part of the first fitting cylinder part, and a second facing wall overhanging outward in a radial direction crossing the upward/downward direction from a portion of the second fitting cylinder part located below the first fitting cylinder part, and facing the first facing wall in the upward/downward direction. In addition, a portion of an upper surface of the second facing wall located outside the first fitting cylinder part in the radial direction is a flat surface or is recessed downward. According to the trigger-type liquid sprayer of the aspect, fitting allowance between the first fitting cylinder part and the second fitting cylinder part can be secured. For this reason, it is possible to prevent the longitudinal supply cylinder part from being damaged due to falling impact, etc., or the invertible adapter from being removed from the supply longitudinal cylinder part. Further, according to the trigger-type liquid sprayer of the aspect, since an escaping portion is formed in the portion of the upper surface of the second facing wall located outside the first fitting cylinder part in the radial direction, when the invertible adapter is assembled to the longitudinal supply cylinder part, the portion of the invertible adapter located outside the first fitting cylinder part in the radial direction can be suppressed from interfering with the first fitting cylinder part. For this reason, assemblability between the invertible adapter and the longitudinal supply cylinder part can be improved.

A fourth aspect of the present invention is a trigger-type liquid sprayer including a sprayer body mounted on a mouth part of a container body, in which a liquid is accommodated, via a mounting cap, and a nozzle part mounted on the sprayer body and having a spray hole configured to spray a liquid. In addition, the sprayer body includes a longitudinal supply cylinder part configured to suction up the liquid in the container body, a trigger mechanism having a trigger part disposed to be movable rearward in a forward biased state and configured to cause the liquid to flow from an inside of the longitudinal supply cylinder part toward the spray hole according to rearward movement of the trigger part, an invertible adapter disposed inside the mounting cap, disposed below the longitudinal supply cylinder part along an axis of the longitudinal supply cylinder part, and connected to the longitudinal supply cylinder part, a storage cylinder disposed inside the mounting cap, disposed below the invertible adapter along the axis, connected to the invertible adapter, and extending in an upward/downward direction, and a storage plunger provided in the storage cylinder to be movable downward in an upward biased state. In addition, the longitudinal supply cylinder part includes a first flow path through which a liquid flows toward the spray hole according to rearward movement of the trigger part, and a second flow path through which part of the liquid flowing through the first flow path flows toward the storage cylinder. In addition, the invertible adapter includes an adapter main body configured to define a first space and a second space, the first space configured to bring the inside of the container body in communication with an inside of the first flow path through an upright introduction port, and the second space configured to bring an inside of the container body in communication with the first space through an inverted introduction port, a switching valve configured to, in a state that the sprayer body is mounted on the container body, block communication between the first space and the second space when the container body is upright and bring the first space and the second space in communication with each other when the container body is inverted, and a relay flow path configured to bring the second flow path and an inside of the storage cylinder in contact with each other.

According to the trigger-type liquid sprayer of the aspect, as the trigger part is operated to move rearward when the container body is upright, the liquid can flow from the inside of the first flow path of the longitudinal supply cylinder part toward the spray hole. Accordingly, the liquid can be sprayed toward the outside through the spray hole of the nozzle part. Further, since part of the liquid flowing through the first flow path can be supplied into the storage cylinder through the second flow path and the relay flow path, the inside of the storage cylinder can be compressed. Accordingly, the storage plunger can be moved downward against the upward biasing force. For this reason, the storage plunger can be moved downward while spraying the liquid. Accordingly, whenever the trigger part is pulled, the liquid can be sprayed while storing (filling) the liquid in the storage cylinder.

After filling of the storage cylinder with the liquid, when the operation of the trigger part is stopped, while supply of the liquid into the storage cylinder is stopped, upward recovery movement of the storage plunger is started. Accordingly, the liquid filled in the storage cylinder can be introduced from the inside of storage cylinder toward the spray hole and sprayed from the spray hole. Accordingly, continuous spraying of the liquid can be performed. Further, since the switching valve blocks communication between the first space and the second space when the container body is upright, after spray of the liquid, the liquid can be suctioned up from the inside of the container body toward the first flow path through the upright introduction port, and the next spray operation can be prepared.

Next, when the trigger part is operated to move rearward upon inversion of the container body, like upon the above-mentioned upright, the liquid is continuously sprayed. Further, since the switching valve brings the first space and the second space in communication with each other upon inversion, the liquid can be suctioned up from the inside of the container body toward the first flow path through the inverted introduction port after spray of the liquid. Accordingly, the next spray operation can be prepared. In this way, even in a state in which the container body is in any one of the upright posture and the inverted posture, continuous spraying of the liquid can be performed.

In particular, the invertible adapter is connected to the longitudinal supply cylinder part while being disposed therebelow, and the storage cylinder is connected to the invertible adapter while being disposed therebelow. For this reason, the longitudinal supply cylinder part, the invertible adapter and the storage cylinder are disposed along an axis of the longitudinal supply cylinder part above and below in series. Accordingly, even when both the invertible adapter and the storage cylinder are disposed inside the mounting cap, it is possible to suppress an increase in cap diameter of the mounting cap. For this reason, reduction in size of the trigger-type liquid sprayer is easily achieved, and for example, operability when the trigger part is operated while gripping the container body can be improved.

According to a fifth aspect of the present invention, in the trigger-type liquid sprayer of the fourth aspect, the longitudinal supply cylinder part includes an outer tube mounted on a mouth part of the container body by the mounting cap, and an inner tube fitted into the outer tube. In addition, the first flow path is formed inside the inner tube. In addition, the second flow path is formed between the inner tube and the outer tube.

According to the trigger-type liquid sprayer of the aspect, the outer tube and the inner tube constitute the longitudinal supply cylinder part in a double tubular shape. For this reason, since the first flow path and the second flow path can be simply formed, and each flow path can be formed while being appropriately defined, simplification of the configuration is easily achieved.

According to a sixth aspect of the present invention, in the trigger-type liquid sprayer of the fourth or fifth aspect, the storage cylinder is formed in a cylindrical shape with a top that opens downward. In addition, the storage plunger is moved downward from the most elevated position by the liquid supplied into the storage cylinder according to rearward movement of the trigger part. In addition, a recovery hole is formed in a portion of a cylinder wall of the storage cylinder located below the storage plunger when the storage plunger is located at the most elevated position, the recovery hole being configured to bring the inside of the storage cylinder in communication with the inside of the container body.

According to the trigger-type liquid sprayer of the aspect, for example, the liquid entering the space in the storage cylinder located below the storage plunger can be discharged through the recovery hole upon inversion of the container body. Further, when the container body is returned to the uptight posture after inversion, even when there is liquid remaining in the storage cylinder, the air in the container body can be introduced through the recovery hole. For this reason, the remaining liquid can be discharged into the container body through the opening of the storage cylinder using air substitution. In this way, it is possible to prevent the liquid from accumulating in the storage cylinder, and it is easy to move the storage plunger smoothly.

Effects of Invention

According to the present invention, it is possible to provide a trigger-type liquid sprayer capable of continuous spraying in both an upright posture and an inverted posture, and further, a trigger-type liquid sprayer capable of enabling continuous spraying in both an upright posture and an inverted posture while suppressing an increase in size of a cap diameter of a mounting cap.

DESCRIPTION OF EMBODIMENTS

First Embodiment

Figure 1:
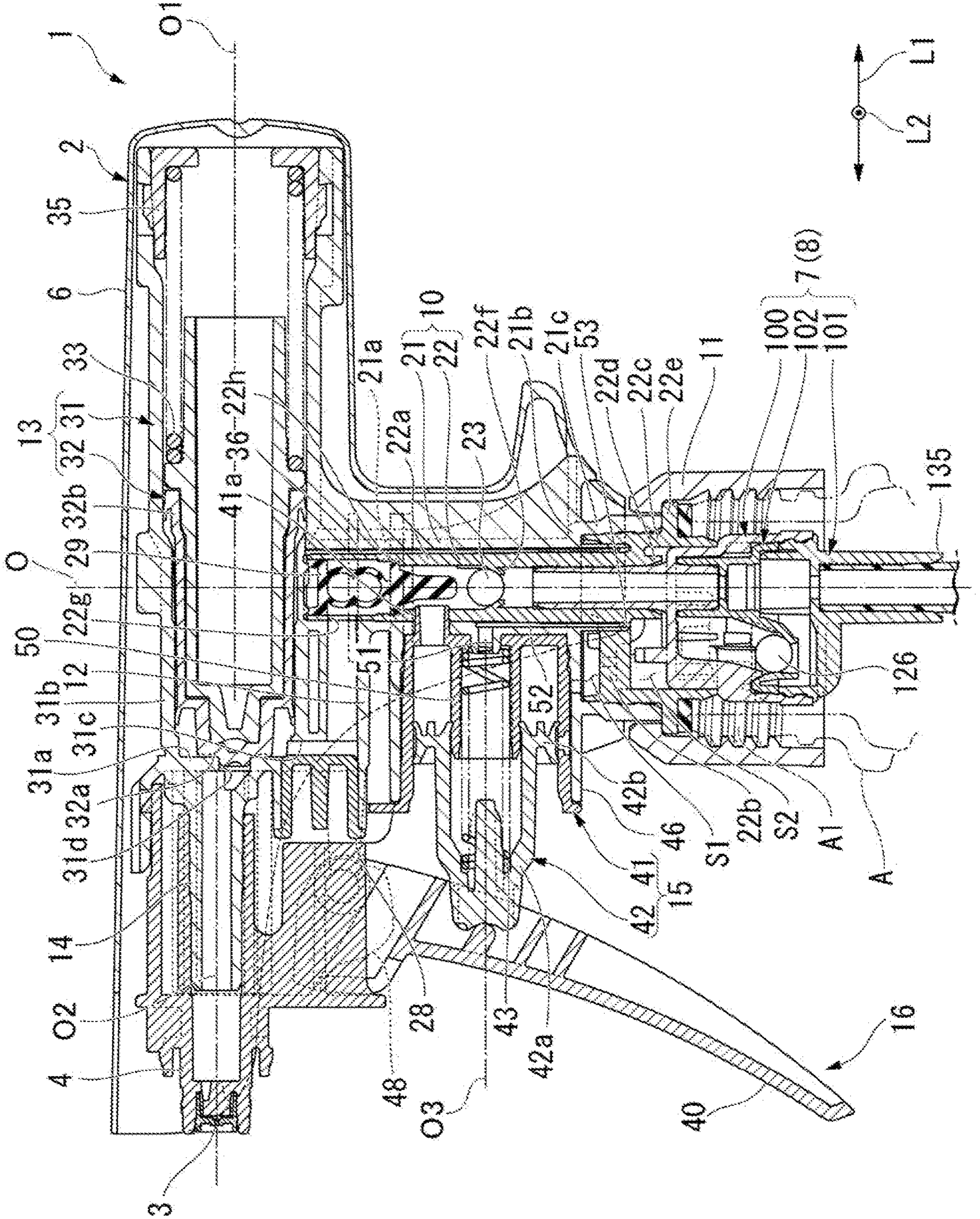
FIG. 1 is a longitudinal cross-sectional view of a trigger-type liquid sprayer according to a first embodiment.

Hereinafter, a first embodiment according to the present invention will be described with reference to the accompanying drawings. In the embodiment, a spray container in which a trigger-type liquid sprayer 1 is attached to a container body A will be exemplarily described. The trigger-type liquid sprayer 1 shown in FIG. 1 includes a sprayer body 2, a nozzle member 4 having a spray hole 3 that sprays a liquid and attached to the sprayer body 2, a cover body 6 configured to cover the sprayer body 2 from above, behind and both sides in a leftward/rightward direction L2, and an invertible adapter 7 attached to a lower end portion of the sprayer body 2. In the embodiment, the liquid stored in the container body A is, for example, a detergent (one that contains surfactant and turns into foam) used in bathrooms, toilets, or the like, and preferably has a viscosity equivalent to that of water. However, the liquid accommodated in the container body A can be changed as appropriate.

The sprayer body 2 has a longitudinal supply cylinder part 10, a mounting cap 11, a connecting tube 12, a storage pump part 13, an injection cylinder part 14, and a trigger mechanism 16 having a main pump part 15.

In the embodiment, a center axis of the longitudinal supply cylinder part 10 is referred to as an axis O. A direction along the axis O is referred to as an upward/downward direction, and in the upward/downward direction, the side of the container body A is a lower side, and an opposite side thereof is an upper side. When seen in the upward/downward direction, in a direction crossing the axis O (a radial direction), one direction is referred to as a forward/rearward direction L1, and a direction perpendicular to the forward/rearward direction L1 is referred to as the leftward/rightward direction L2. In the forward/rearward direction L1, the side of the nozzle member 4 is a front side, and an opposite side thereof is a rear side.

The liquid suctioned up from the inside of the container body A flows through the longitudinal supply cylinder part 10 by the main pump part 15. The longitudinal supply cylinder part 10 includes an outer tube 21, and an inner tube 22 fitted into the outer tube 21. The outer tube 21 is formed in a multi-stage tubular shape, a diameter of which is reduced upward. Specifically, the outer tube 21 includes an outer tube small diameter portion 21*a* located on an upper side, and an outer tube large diameter portion c continuous with a lower side of the outer tube small diameter portion 21*a* via an outer tube stepped portion 21*b*. The inner tube 22 is formed in a multi-stage tubular shape similar to the outer tube 21. Specifically, the inner tube 22 includes an inner tube small diameter portion 22*a* located on an upper side, and an inner tube large diameter portion 22*c* continuous with a lower side of the inner tube small diameter portion 22*a* via an inner tube stepped portion 22*b*.

Figure 2:
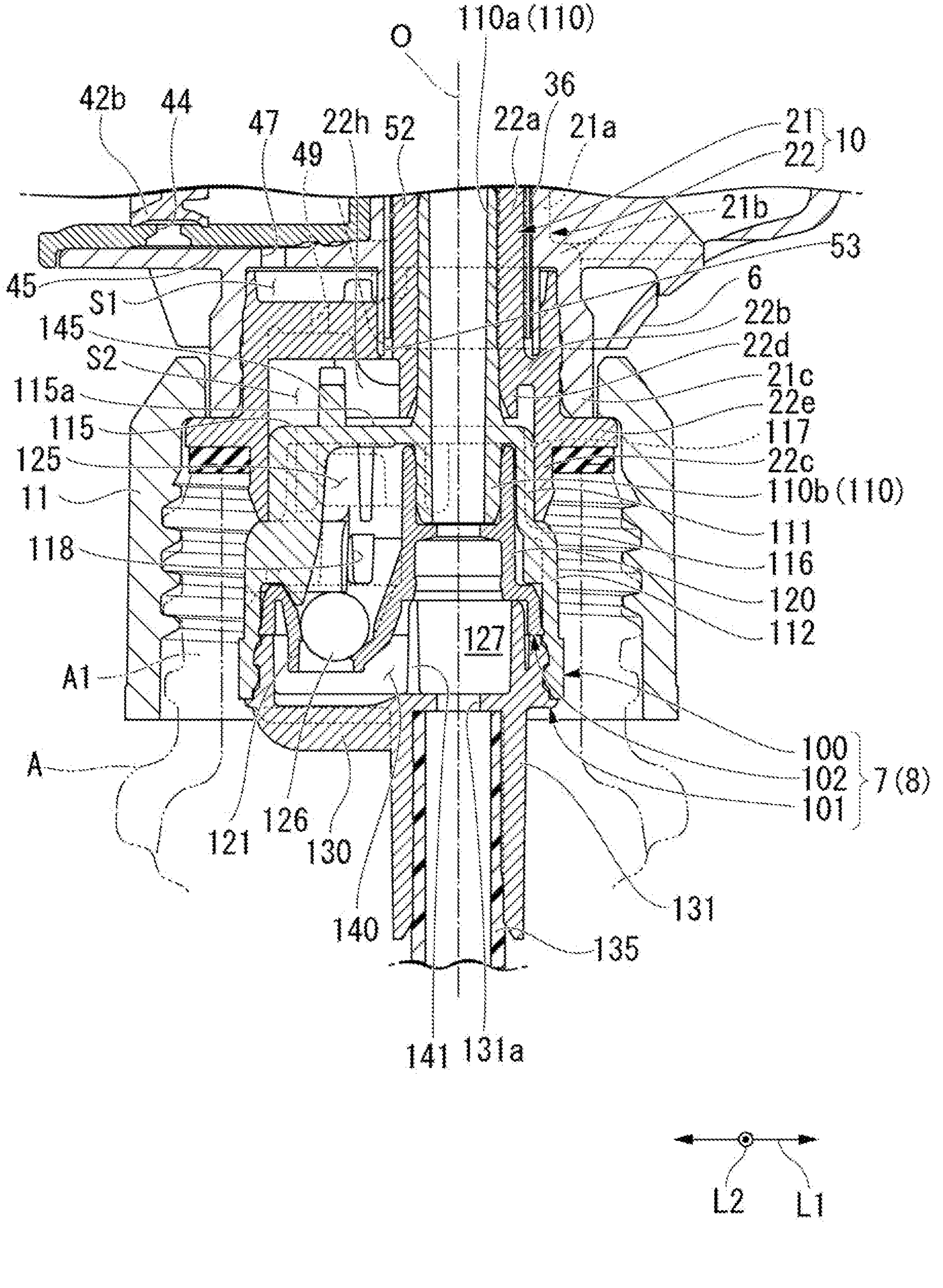
FIG. 2 is a partially enlarged view of FIG. 1.
Figure 3:
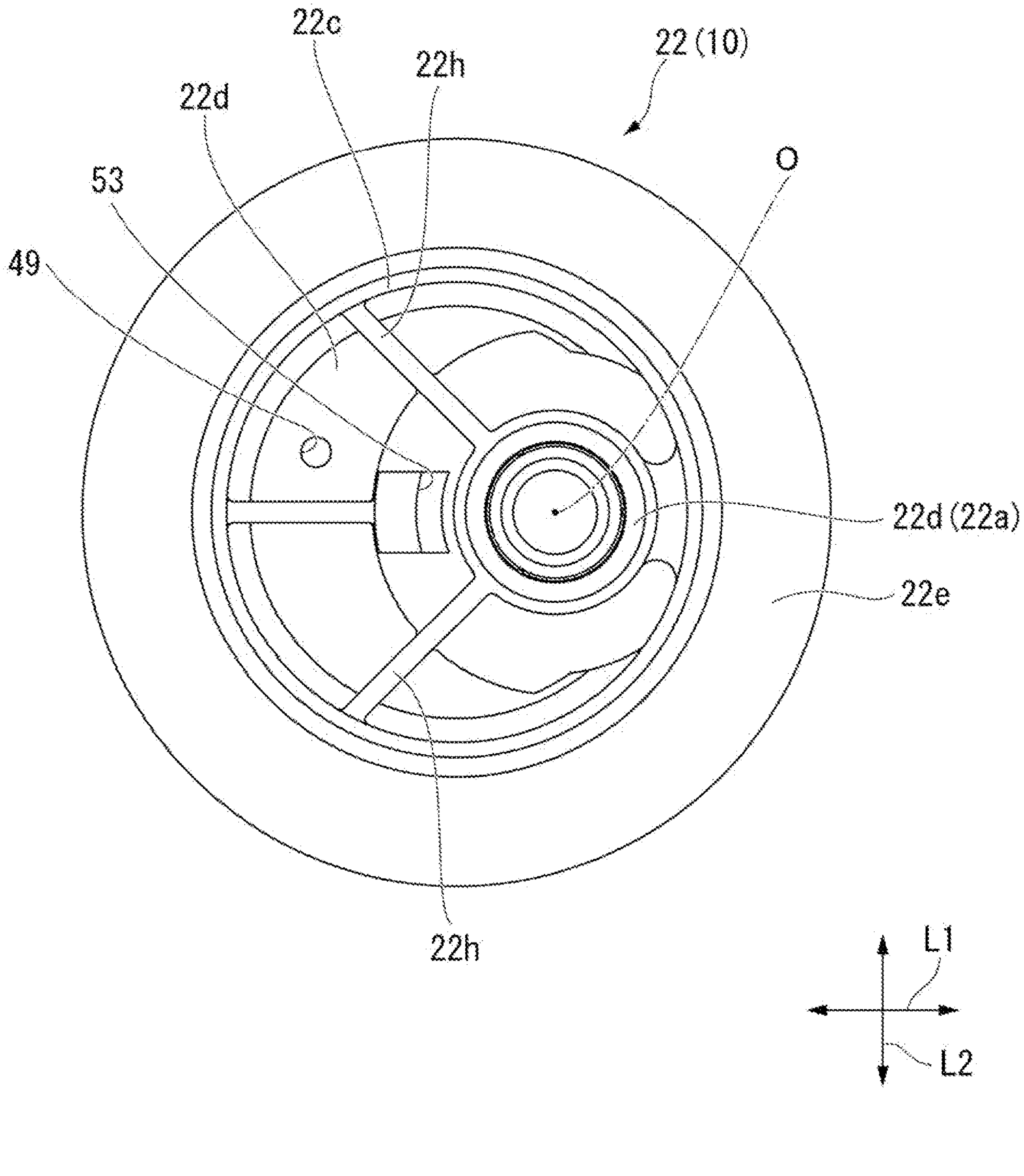
FIG. 3 is a bottom view of an inner tube.

The longitudinal supply cylinder part 10 is configured as the small diameter portions 21*a* and 22*a* and the large diameter portions 21*c* and 22*c* are fitted to each other in a state in which the stepped portions 21*b* and 22*b* of the outer tube 21 and the inner tube 22 face each other with an interval in the upward/downward direction. The inner tube small diameter portion 22*a* passes through the inner tube stepped portion 22*b* in the upward/downward direction. A portion of the inner tube small diameter portion 22*a* protruding downward from the inner tube stepped portion 22*b* constitutes an inner tube protrusion portion 22*d*. As shown in FIG. 2 and FIG. 3, a connecting rib 22*h* is formed on the inner tube stepped portion 22*b*. The connecting rib 22*h* protrudes downward from the inner tube stepped portion 22*b* and extends in the radial direction. The connecting rib 22*h* bridges between the inner tube large diameter portion 22*c* and the inner tube protrusion portion 22*d*. Two connecting ribs 22*h* extend in front of the inner tube protrusion portion 22*d* at positions shifted on both sides of the axis O in the circumferential direction when seen from the front. A flange portion 2*e* overhanging outward in the radial direction (a direction crossing the axis O when seen in the upward/downward direction) is formed on a portion of the inner tube large diameter portion 22*c* disposed below the outer tube large diameter portion 21*c*.

As shown in FIG. 1, a ball valve 23 is provided in the inner tube small diameter portion 22*a*. The ball valve 23 is provided on a lower valve seat portion 22*f* provided on the inner tube small diameter portion 22*a* to be separable from above the lower valve seat portion 22*f*. The ball valve 23 switches communication and blocking between the inside of the container body A and the main pump part 15 through the inside of the inner tube small diameter portion 22*a*. Specifically, the ball valve 23 is a check valve configured to block communication between the inside of the container body A and the main pump part 15 upon compression by the main pump part 15 (a main cylinder 41, which will be described below) and allow communication between the inside of the container body A and the main pump part 15 upon decompression by the main pump part 15.

The mounting cap 11 is formed in a tubular shape extending in the upward/downward direction. The mounting cap 11 is detachably fastened to the mouth part A1 in a state in which the flange portion 22*e* is sandwiched between the mounting cap 11 and an upper end opening edge of a mouth part A1 in the container body A via a packing. Further, a fixing method of the mounting cap 11 and the mouth part A1 may be a method other than a screw (for example, fitting or the like).

The connecting tube 12 extends forward from an upper end portion of the outer tube small diameter portion 21*a*. A rear end opening part of the connecting tube 12 is in communication with the inside of the inner tube small diameter portion 22*a* through a connecting port 22*g* formed in the inner tube small diameter portion 22*a*. A restricting plug 28 is mounted on a front end opening part of the connecting tube 12. The restricting plug 28 closes the front end opening part of the connecting tube 12. A storage valve 29 is provided in a portion of the inner tube small diameter portion 22*a* located above the ball valve 23. The storage valve 29 is provided on an upper valve seat portion 22*h* provided on the inner tube small diameter portion 22*a* to be separable from above the upper valve seat portion 22*h*. The storage valve 29 switches communication and blocking between the main pump part 15 and the storage pump part through the connecting tube 12 and the longitudinal supply cylinder part 10.

Specifically, the storage valve 29 is a check valve configured to allow supply of the liquid from the longitudinal supply cylinder part 10 into the storage pump part 13 (a storage cylinder 31, which will be described below) upon compression of the main pump part 15 and restrict outflow of the liquid from the storage pump part 13 into the longitudinal supply cylinder part 10.

The storage pump part 13 includes the storage cylinder 31, a storage plunger 32, and a biasing member 33. The storage cylinder 31 is provided above the longitudinal supply cylinder part 10. The storage cylinder 31 has a front wall portion 31*a* located on a front end portion and a cylinder tube 31*b* extending rearward from an outer circumferential edge of the front wall portion 31*a*, and is formed in a cylindrical with a top shape that opens rearward. In the embodiment, a center axis of the storage cylinder (the cylinder tube 31*b*) is referred to as an axis O1. The axis O1 in the embodiment extends in the forward/rearward direction L1. However, the axis O1 may not coincide with the forward/rearward direction L1.

A supply hole 31*c* is formed in the front end portion of the cylinder tube 31*b* and the front end portion of the connecting tube 12. The supply hole 31*c* passes through the lower portion of the cylinder tube 31*b* and the upper portion of the connecting tube 12 in the upward/downward direction. The supply hole 31*c* brings the inside of the storage cylinder 31 in communication with the inside of the connecting tube 12. Further, a spring receiving member 35 is fitted into the rear end opening part of the Cylinder tube 31*b*. A communication port 31*d* passing through the front wall portion 31*a* in the forward/rearward direction L1 is formed in the front wall portion 31*a*. The communication port 31*d* is disposed coaxially with the axis O1.

As shown in FIG. 1 and FIG. 2, a liquid collecting passage 36 is formed between the outer tube small diameter portion 21*a* and the inner tube small diameter portion 22*a*. The liquid collecting passage 36 is, for example, a longitudinal groove formed in the inner circumferential surface of the outer tube small diameter portion 21*a* and extending in the upward/downward direction. The liquid collecting passage 36 is formed in a portion located behind the axis O. The upper end portion of the liquid collecting passage 36 opens in the cylinder tube 31*b*. The lower end portion of the liquid collecting passage 36 opens in a space surrounded by the outer tube stepped portion 21*b* and the inner tube stepped portion 22*b* (hereinafter, referred to as a collecting space S1).

The storage plunger 32 is provided in the storage cylinder 31 to be movable in the forward/rearward direction L1. The storage plunger 32 is formed in a cylindrical shape with a top that opens rearward. Specifically, the storage plunger 32 has a closing wall 32*a* located on a front end portion and a sliding tube 32*b* extending rearward from the outer circumferential edge of the closing wall 32*a*, and is formed in a cylindrical shape with a top that opens rearward. The closing wall 32*a* of the storage plunger 32 comes into contact with and is separated from the rear side of the front wall portion 31*a* as the storage plunger 32 moves forward and rearward through the storage cylinder 31 in a state in which the outer circumferential surface of the sliding tube 32*b* slides on the inner circumferential surface of the cylinder tube 31*b*.

The biasing member 33 is provided behind the storage plunger 32. The biasing member 33 biases the storage plunger 32 forward via a space between the storage plunger 32 and the spring receiving member 35.

The injection cylinder part 14 extends forward from the front wall portion 31*a*. The inside of the injection cylinder part 14 is configured to be communicable with the inside of the storage cylinder 31 through the communication port 31*d*. In the embodiment, a center axis of the injection cylinder part 14 is referred to as an axis O2. The axis O2 extends parallel to the axis O1 in the forward/rearward direction L1. However, the axis O2 may be disposed coaxially with the axis O1. In addition, the axis may not coincide with the forward/rearward direction L1.

The trigger mechanism 16 includes the main pump part 15, and a trigger part 40. The main pump part 15 performs storage and pressure feeding of the liquid in the container body A according to the operation of the trigger part 40. The main pump part includes the main cylinder 41, and a main piston 42. The main cylinder 41 is provided in front of the outer tube small diameter portion 21*a* in the longitudinal supply cylinder part 10. The main cylinder 41 is formed in a bottomed tubular shape that opens forward about a pump axis O3 in the forward/rearward direction L1. The main cylinder is fitted from the front into an attachment tube 46 extending forward from the longitudinal supply cylinder part 10 (the outer tube small diameter portion 21*a*).

A communication tube 41*a* configured to bring the inside of the main cylinder in communication with the longitudinal supply cylinder part 10 (the inner tube small diameter portion 22*a*) is provided on the lower wall portion of the main cylinder 41. The communication tube 41*a* protrudes rearward from an outer circumferential portion of the lower wall portion of the main cylinder 41. The rear end portion of the communication tube 41*a* is inserted into a portion of the small diameter portions 21*a* and 22*a* located above the ball valve 23. The rear end opening part of the communication tube 41*a* opens in the longitudinal supply cylinder part 10 (the inner tube small diameter portion 22*a*). That is, the inside of the main cylinder 41 is in communication with the inside of the longitudinal supply cylinder part 10 through the communication tube 41*a*.

As shown in FIG. 2, an external air introduction hole 44 is formed in a portion of the circumferential wall portion of the main cylinder 41 located below the pump axis O3. The external air introduction hole 44 is in communication with the inside of an introduction passage 45 formed between the circumferential wall portion of the main cylinder 41 and the attachment tube 46. The introduction passage 45 is in communication with an external air communication hole 47 formed in the attachment tube 46. The external air communication hole 47 passes through the portion of the attachment tube 46 exposed to the collecting space S1 (the portion constituting the outer tube stepped portion 21*b*) in the upward/downward direction. A supply hole 49 is formed in a portion of the inner tube stepped portion 22*b* located between the connecting ribs 22*h*. The supply hole 49 passes through the inner tube stepped portion 22*b* in the upward/downward direction. The lower end opening part of the supply hole 49 opens in a space surrounded by the inner tube 22 and the invertible adapter 7 (hereinafter, referred to as a merging space S2).

As shown in FIG. 1, the main piston 42 is provided in the main cylinder 41 movable in the forward/rearward direction L1. The main piston 42 includes a piston main body portion 42*a*, and a sliding tube portion 42*b*. The piston main body portion 42*a* is formed in a cylindrical shape with a top about the pump axis O3. The piston main body portion 42*a* is supported by a piston guide 50 protruding from the lower wall portion of the main cylinder 41 to be movable forward and rearward. An biasing member 43 is interposed between the piston main body portion 42*a* and the main cylinder (the piston guide 50). The biasing member 43 biases the main piston 42 forward via the piston main body portion 42*a*. Accordingly, the main piston 42 is configured to be movable in the forward/rearward direction L1 in a forward biased state.

A discharge hole 51 is formed in a portion of the outer tube small diameter portion 21*a* exposed in the piston guide 50. The discharge hole 51 passes through the outer tube small diameter portion 21*a* in the forward/rearward direction. An internal pressure collecting passage 52 is formed between the outer tube small diameter portion a and the inner tube small diameter portion 22*a*. The internal pressure collecting passage 52 is, for example, a longitudinal groove formed in a portion of an inner circumferential surface of the outer tube small diameter portion 21*a* facing the liquid collecting passage 36 and extending in the upward/downward direction. The upper end portion of the internal pressure collecting passage 52 is in communication with the discharge hole 51. A through-hole 53 passing through the inner tube stepped portion 22*b* in the upward/downward direction is formed in a portion of the inner tube stepped portion 22*b* located in front of the axis O1. The through-hole 53 is formed at a position overlapping the internal pressure collecting passage 52 when seen in the upward/downward direction. The upper end opening part of the through-hole 53 is in communication with each of the liquid collecting passage 36 and the internal pressure collecting passage 52 in the collecting space S1. The lower end opening part of the through-hole 53 is in communication with the merging space S2.

The sliding tube portion 42*b* is continuous with the rear end portion of the piston main body portion 42*a*. The sliding tube portion 42*b* is disposed coaxially with the pump axis O3 and formed in a tubular shape. The sliding tube portion 42*b* surrounds the piston main body portion 42*a*. The sliding tube portion 42*b* is in close contact with the inner circumferential surface of the main cylinder 41. The sliding tube portion 42*b* slides on the inner circumferential surface of the main cylinder 41 according to forward and rearward movement of the main piston 42 with respect to the main cylinder 41.

The trigger part 40 extends forward in front of the longitudinal supply cylinder part 10 as it goes downward. The upper end portion of the trigger part 40 is supported by a bearing part 48 provided below the injection cylinder part 14 to be pivotable about an axis in the leftward/rightward direction L2. A front end portion of the piston main body portion 42*a* is connected to an intermediate portion of the trigger part 40 in the upward/downward direction. Accordingly, the main piston 42 moves rearward with respect to the main cylinder 41 according to rearward pivotal movement of the trigger part 40.

The nozzle member 4 is attached to the injection cylinder part 14 from the front. The nozzle member 4 is formed in a cylindrical shape with a top that opens rearward. The inside of the nozzle member 4 is in communication with the inside of the injection cylinder part 14. The spray hole 3 is formed in the top wall portion of the nozzle member 4. The spray hole 3 passes through the top wall portion of the nozzle member in the forward/rearward direction L1.

The invertible adapter 7 is mounted on the lower end portion of the longitudinal supply cylinder part 10. The invertible adapter 7 enables injection of the liquid in the container body A even when the spray container is in either an upright posture (a posture in which the mouth part A1 is directed upward) or an inverted posture (a posture in which the mouth part A1 is directed downward). The invertible adapter 7 includes a first attachment member 100 and a second attachment member 101, which are assembled in the upward/downward direction, and a partition member 102 configured to partition a space between the first attachment member 100 and the second attachment member 101. Further, an adapter main body 8 of the embodiment is constituted by the first attachment member 100, the second attachment member 101 and the partition member 102.

As shown in FIG. 2, the first attachment member 100 is formed in a multi-stage tubular shape, a diameter of which is reduced upward. Specifically, the first attachment member 100 includes a small diameter portion 110, a middle diameter portion 111 and a large diameter portion 112.

The small diameter portion 110 is disposed coaxially with the axis O. A first flange 115 overhanging outward in the radial direction is formed in a portion of the small diameter portion 110 located above the lower edge. That is, the small diameter portion passes through the first flange 115 in the upward/downward direction. A fitting cylinder part 110*a* fitted into the inner tube small diameter portion 22*a* constitutes a portion of the small diameter portion 110 located above the first flange 115. The fitting cylinder part 110*a* is fitted to a portion of the inner tube small diameter portion 22*a* located above the outer tube stepped portion 21*b* through the lower end opening part of the inner tube small diameter portion 22*a*. A portion of the small diameter portion 110 located below the first flange 115 constitutes a protrusion tube portion 110*b* protruding inside the first attachment member 100. Further, the first flange 115 is disposed in the vicinity of the lower edge of the connecting rib 22*h*.

The middle diameter portion 111 extends downward from the outer circumferential edge of the first flange 115. The middle diameter portion 111 is fitted into the inner tube large diameter portion 22*c* from below the inner tube large diameter portion 22*c*. Accordingly, the lower end opening part of the inner tube large diameter portion 22*c* is closed. A second flange 116 overhanging outward in the radial direction is formed on the lower edge of the middle diameter portion 111. The second flange 116 approaches or abuts the lower edge of the inner tube large diameter portion 22*c* from below the inner tube large diameter portion 22*c*. As shown in FIG. 2, a connecting groove 117 is formed in an outer circumferential surface of the middle diameter portion and an upper surface of the second flange 116. The connecting groove 117 is an L-shaped groove extending over the outer circumferential surface of the middle diameter portion 111 and the upper surface of the second flange 116 when seen in a side view. The connecting groove 117 is preferably formed in a portion located behind the axis O. In the example shown, the connecting groove 117 is formed at a position shifted from the axis O in the circumferential direction when seen from the front. The tipper end opening part of the connecting groove 117 is in communication with the merging space S2. The lower end opening part of the connecting groove 117 is in communication with the inside of the container body A. That is, the liquid flowing through the liquid collecting passage 36 or the gas flowing through the introduction passage 45 and the internal pressure collecting passage 52 is in communication with the inside of the container body A through the merging space S2 and the connecting groove 117.

The large diameter portion 112 extends downward from the outer circumferential edge of the second flange 116. An inverted introduction port 118 passing through the large diameter portion 112 in the radial direction is formed in the front portion of the large diameter portion 112 (in front of the axis O).

The partition member 102 has a first communication tube 120, and a second communication tube 121.

The first communication tube 120 is disposed coaxially with the axis O1. The protrusion tube portion 110*b* is fitted into the first communication tube 120 from above the first communication tube 120. The second communication tube 121 is continuous with the front of the first communication tube 120. The second communication tube has a diameter that is gradually reduced downward. In the embodiment, a space defined between the second communication tube 121 and the first attachment member constitutes a valve chamber (second space) 125. The valve chamber 125 is in communication with the inside of the container body A through the inverted introduction port 118. A ball valve 126 is accommodated in the valve chamber 125. The ball valve opens and closes the lower end opening of the second communication tube 121 by coming in contact with and being separated from the lower end opening edge of the second communication tube 121.

The second attachment member 101 has a closing part 130, and a fixing tube 131. The closing part 130 is formed in a bottomed tubular shape that opens upward. The closing part 130 is fitted into the large diameter portion 112 with the partition member 102 sandwiched therebetween. The fixing tube 131 passes through the lower wall portion of the closing part 130 in the upward/downward direction in the rear portion of the closing part 130 (a position coaxial with the axis O). A suction tube 135 is fitted into the lower portion of the fixing tube 131. An upper end opening part (upright introduction port) 131*a* of the fixing tube 131 is in communication with the inside of the first communication tube 120. Accordingly, the first communication tube 120 is in communication with the inside of the container body A through the fixing tube 131. Meanwhile, the second communication tube 121 is in communication with the inside of the container body A through the inverted introduction port 118.

A space defined by the closing part 130, the fixing tube 131 and the second communication tube 121 constitute a connecting flow path 140 configured to connect the valve chamber 125 and the fixing tube 131. The connecting flow path 140 is in communication with the inside of the fixing tube 131 through a slit 141 formed in the fixing tube 131. Further, a space reaching the small diameter portion 110 from the connecting flow path 140 via the slit 141 constitutes a first space 127 of the embodiment.

As described above, the invertible adapter 7 is assembled to the longitudinal supply cylinder part 10 as the fitting cylinder part 110*a* is fitted into the inner tube small diameter portion 22*a* and the middle diameter portion 111 is fitted into the inner tube large diameter portion 22*c*. In this case, the first flange 115 faces the inner tube stepped portion 22*b* with an interval in the upward/downward direction. A portion of the upper surface of the first flange 115 located around the inner tube small diameter portion 22*a* constitutes an escaping portion 115*a*. The escaping portion 115*a* is formed on a flat surface perpendicular to the upward/downward direction. That is, a portion of the first attachment member 100 located outside the inner tube small diameter portion 22*a* in the radial direction opens outward in the radial direction. In the embodiment, the escaping portion 115*a* faces the connecting rib 22*h* in the upward/downward direction. Accordingly, it is easy to ensure strength of the inner tube protrusion portion 22*d* by ensuring a length of the connecting rib 22*h* in the upward/downward direction.

A projection portion 145 is formed in a portion of the first flange 115 located in front of the escaping portion 115*a*. The projection portion 145 protrudes upward from a portion of the first flange 115 located between the connecting ribs 22*b* in the circumferential direction. The projection portion 145 is disposed in front of the inner tube protrusion portion 22*d* of the first flange 115 with an interval.

Next, an action of the trigger-type liquid sprayer 1 will be described. In the following description, a spray operation in an upright posture and a spray operation in an inverted posture will be described. In the upright posture of the spray container, the ball valve 23 is seated on the lower valve seat portion 22*f* due to its own weight, and the ball valve 126 is seated on the lower end opening edge of the second communication tube 121 due to its own weight. In the upright posture of the spray container, the trigger part 40 is pulled rearward from an initial position to spray the liquid in the container body A. Then, the main piston 42 moves rearward from the foremost position and the inside of the main cylinder 41 is compressed. Accordingly, the liquid in the main cylinder 41 is supplied into the longitudinal supply cylinder part 10 (the inner tube small diameter portion 22*a*) through the communication tube 41*a*. Then, the liquid supplied into the longitudinal supply cylinder part 10 pushes the ball valve 23 downward and pushes the storage valve 29 upward. Accordingly, the storage valve 29 is separated upward from the upper valve seat portion 22*h* in a state in which the ball valve 23 is in contact with the lower valve seat portion 22*f*. Further, when the main piston 42 moves rearward, the gas between the piston main body portion 42*a* and the piston guide 50 flows into the merging space S2 through the discharge hole 51, the internal pressure collecting passage 52 and the through-hole 53, and then, is discharged into the container body A through the connecting groove 117.

Then, the liquid in the longitudinal supply cylinder part 10 is supplied into the storage cylinder 31 through the inside of the connecting tube 12 and the supply hole 31*c*. When the storage cylinder 31 is compressed due to the inflow of the liquid into the storage cylinder 31, the storage plunger 32 moves rearward from the maximum advance position against the biasing force of the biasing member 33. Accordingly, the liquid is stored in the storage cylinder 31. As the storage plunger 32 moves rearward, the closing wall 32*a* is separated rearward from the front wall portion 31*a* of the storage cylinder 31 and the communication port 31*d* is opened. Accordingly, the liquid stored in the storage cylinder 31 passes through the inside of the injection cylinder part 14 through the supply hole 31*c*, and then, is sprayed to the outside through the spray hole 3.

Like the embodiment, in the configuration including the storage pump part 13, whenever the trigger part 40 is operated, part of the liquid supplied into the storage cylinder 31 from the main cylinder 41 is sprayed through the spray hole 3, and part of the liquid is stored in the storage cylinder 31. For this reason, when the operation of the trigger part 40 is stopped, while supply of the liquid into the storage cylinder 31 is stopped, the liquid stored in the storage cylinder 31 is continuously supplied to the injection cylinder part 14 as the storage plunger 32 is moved forward by the biasing force of the biasing member 33. Accordingly, even in a state in which the operation of the trigger part 40 is stopped, the liquid can be continuously sprayed through the spray hole 3. Further, excess liquid in the storage cylinder 31 is discharged from the storage cylinder through the liquid collecting passage 36. The liquid flowing into the liquid collecting passage 36 flows into the merging space S2 through the through-hole 53, and then, is returned into the container body A through the connecting groove 117.

When the operating force with respect to the trigger part 40 is released, the main piston 42 is recovered forward in the main cylinder 41 by the biasing force of the biasing member 43, and the trigger part 40 is also recovered forward according to this. As a result, the inside of the main cylinder 41 is decompressed. Then, the ball valve 23 rises from the lower valve seat portion 22*f*, and the inside of the container body A and the main cylinder 41 communicates through the inside of the inner tube small diameter portion 22*a*. Meanwhile, the storage valve 29 blocks communication between the inside of the main cylinder 41 and the inside of the storage cylinder 31 through the inside of the inner tube small diameter portion 22*a* by maintaining the state seated on the upper valve seat portion 22*h* In addition, as the ball valve 23 rises from the lower valve seat portion 22*f* a negative pressure is also applied to the connecting flow path 140 through the inner tube small diameter portion 22*a*. For this reason, as the ball valve 126 maintains a state seated on the lower end opening edge of the second communication tube 121, communication between the connecting flow path 140 and the valve chamber 125 is blocked. Accordingly, the liquid in the container body A flows into the trigger-type liquid sprayer 1 through the suction tube 135. The liquid flowing into the suction tube flows into the inner tube small diameter portion 22*a* through the connecting flow path 140, and then, flows into the main cylinder 41 through the communication tube 41*a*. Further, as the liquid flows into the suction tube 135, the inside of the container body A is decompressed. Then, the external air flows into the collecting space S1 through the external air introduction hole 44, the introduction passage 45 and the external air communication hole 47, and then, flows into the merging space S2 through the supply hole 49. The external air flowing into the merging space S2 flows into the container body A through the connecting groove 117.

Next, when the spray container is used in the inverted posture, the ball valve 23 is separated from the lower valve seat portion 22*f* due to its own weight, and the ball valve 126 is separated from the lower end opening edge of the second communication tube 121 due to its own weight. Even in the inverted posture, the inside of the main cylinder 41 is compressed by pulling the trigger part 40 rearward. For this reason, the liquid in the main cylinder 41 flows into the inner tube small diameter portion 22*a* through the communication tube 41*a*, and then, flows into the storage cylinder 31 through the connecting tube 12. After that, part of the liquid flowing into the storage cylinder 31 is sprayed through the spray hole 3, and part of the liquid is stored in the storage cylinder 31.

Even in the inverted posture, the inside of the main cylinder 41 is decompressed by releasing the operating force with respect to the trigger part 40. Next, the liquid in the container body A flows into the valve chamber 125 through the inverted introduction port 118, and then, flows into the first communication tube 120 through the lower end opening of the second communication tube 121, the connecting flow path 140, and the slit 141. The liquid flowing into the first communication tube 120 flows through the inside of the inner tube small diameter portion 22*a*, and then, is introduced into the main cylinder 41 through the communication tube 41*a*.

In addition, even in the inverted posture, when the operation of the trigger part is stopped, as the storage plunger 32 is moved forward by the biasing force of the biasing member 33, the liquid stored in the storage cylinder 31 is continuously supplied to the injection cylinder part 14. Accordingly, even in a state in which the operation of the trigger part 40 is stopped, the liquid can be continuously sprayed through the spray hole 3.

In this way, in the embodiment, by providing the storage pump part 13, part of the liquid flowing into the storage cylinder 31 can be sprayed through the spray hole 3, and simultaneously, part of the liquid can be stored in the storage cylinder 31. For this reason, even when the trigger part 40 is not operated, the liquid stored in the storage cylinder 31 can be sprayed by a forward biasing force applied to the storage plunger 32. Further, in the trigger-type liquid sprayer 1 of the embodiment, the liquid can be sprayed by providing the invertible adapter 7 even in any posture of the upright posture and the inverted posture. As a result, in both the upright posture and the inverted posture, continuous spraying of the liquid becomes possible.

In particular, in the embodiment, as the storage cylinder 31 (and the storage plunger 32) extends in the forward/rearward direction, a volume of the storage cylinder is easily secured while suppressing an increase in size of the trigger-type liquid sprayer 1 in the upward/downward direction.

In the embodiment, the storage pump part 13 is provided above the longitudinal supply cylinder part 10. According to this configuration, in designing the storage pump part 13, there is little interference with other components of the trigger-type liquid sprayer 1. For this reason, it is easy to improve a degree of design freedom of the storage pump part 13 and secure the volume of the storage cylinder 31.

In the embodiment, the inner tube small diameter portion 22*a* includes the inner tube protrusion portion 22*d* protruding downward from the inner tube stepped portion 22*b*, and the small diameter portion 110 (the fitting cylinder part 110*a*) is fitted to a portion located above the outer tube stepped portion 21*b* through the lower end opening part of the inner tube small diameter portion 22*a*. According to this configuration, fitting allowance between the inner tube small diameter portion 22*a* and the fitting cylinder part 110*a* can be secured. For this reason, it is possible to suppress the longitudinal supply cylinder part 10 from being damaged due to a falling impact or the like or the invertible adapter 7 from being removed from the longitudinal supply cylinder part 10. Further, in the embodiment, the escaping portion 155*a* is formed in a portion of the invertible adapter 7 located outside the inner tube protrusion portion 22*d* in the radial direction. According to this configuration, in assembling the invertible adapter 7 to the longitudinal supply cylinder part 10, it is possible to suppress the portion of the invertible adapter 7 located outside the inner tube protrusion portion 22*d* in the radial direction from interfering with the inner tube protrusion portion 22*d*. For this reason, it is possible to improve assemblability between the invertible adapter 7 and the longitudinal supply cylinder part 10. Further, in the embodiment, the connecting rib 22*h* protruding downward from the inner tube stepped portion 22*b* is formed. For this reason, if the invertible adapter 7 is displaced with respect to the longitudinal supply cylinder part 10 to be inclined forward and rearward with respect to the axis O (gouged), displacement of the invertible adapter 7 with respect to the longitudinal supply cylinder part 10 can be restricted by bring the invertible adapter 7 (the first flange 115) in contact with the connecting rib 22*h*. As a result, it is possible to suppress the invertible adapter 7 from being removed from the longitudinal supply cylinder part 10.

Hereinabove, while the preferred embodiments of the present invention have been described, the present invention is not limited to these embodiments. Additions, omissions, substitutions, and other changes to the configuration are possible without departing from the spirit of the present invention. The present invention is not limited by the above description, but only by the claims appended hereto. In the above-mentioned embodiments, while the configuration in which the storage pump part is provided above the longitudinal supply cylinder part 10 has been described, it is not limited to the configuration. The storage pump part 13 may be provided below the longitudinal supply cylinder part 10 as long as it extends in the forward/rearward direction.

In the above-mentioned embodiment, while the configuration in which the portion of the upper surface of the first flange 115 located around the inner tube protrusion portion 22*d* is formed on a flat surface has been described, it is not limited to the configuration. The portion of the upper surface of the first flange 115 located around the inner tube protrusion portion 22*d* may be recessed downward compared to the other portion. Even in this case, since the portion of the invertible adapter 7 located outside the inner tube protrusion portion 22*d* in the radial direction is opened outward in the radial direction, the above-mentioned effects can be exhibited. However, a support tube or the like, into which the inner tube protrusion portion 22*d* is fitted, configured to support the inner tube protrusion portion 22*d* from the outside in the radial direction may be provided on the first flange 115. In the above-mentioned embodiment, while the configuration in which the inner tube small diameter portion 22*a* includes the inner tube protrusion portion 22*d* protruding downward from the inner tube stepped portion 22*b* has been described, it is not limited to the configuration.

In addition, the components in the above-mentioned embodiment can be appropriately replaced with known components without departing from the spirit of the present invention, and further, the above-mentioned variants may be appropriately combined.

Second Embodiment

Hereinafter, a second embodiment of the trigger-type liquid sprayer according to the present invention will be described with reference to the accompanying drawings. In the embodiment, a spray container in which the trigger-type liquid sprayer is attached to a container body will be exemplarily described.

Figure 4:
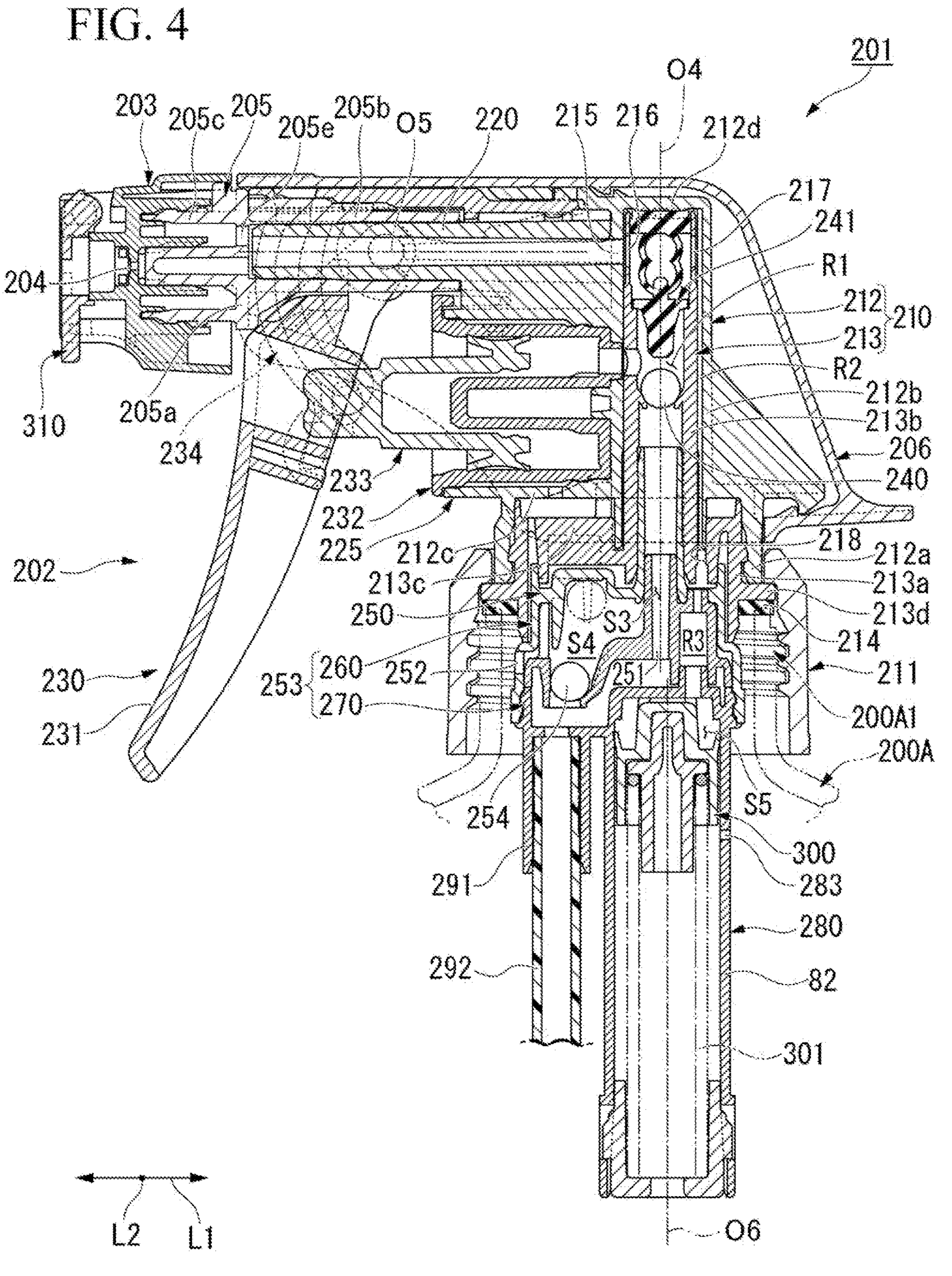
FIG. 4 is a longitudinal cross-sectional view showing a second embodiment of the trigger-type liquid sprayer according to the present invention, and a longitudinal cross-sectional view in a state in which a container body is in an upright posture.

As shown in FIG. 4, a trigger-type liquid sprayer 201 of the embodiment includes a sprayer body 202 mounted in a mouth part of a container body 200A in which a liquid is accommodated, a nozzle part (nozzle member) 203 in which a spray hole 204 configured to spray a liquid is formed, a relay member 205 configured to connect the sprayer body 202 and the nozzle part 203, and a cover body 206 configured to cover the sprayer body 202. Further, each component of the trigger-type liquid sprayer 201 is a molded product using a synthetic resin unless otherwise specified.

Further, the liquid accommodated in the container body 200A of the embodiment is, for example, a detergent (one that contains surfactant and turns into foam) used in a bathroom, a toilet, or the like, and the liquid having the same viscosity as water is appropriately used. However, the liquid is not limited to this case. As the liquid, for example, a chemical agent to be applied to the body, a deodorization to be sprayed into the air, a liquid having a perfume component, or the like, may be used.

(Sprayer Body)

Figure 5:
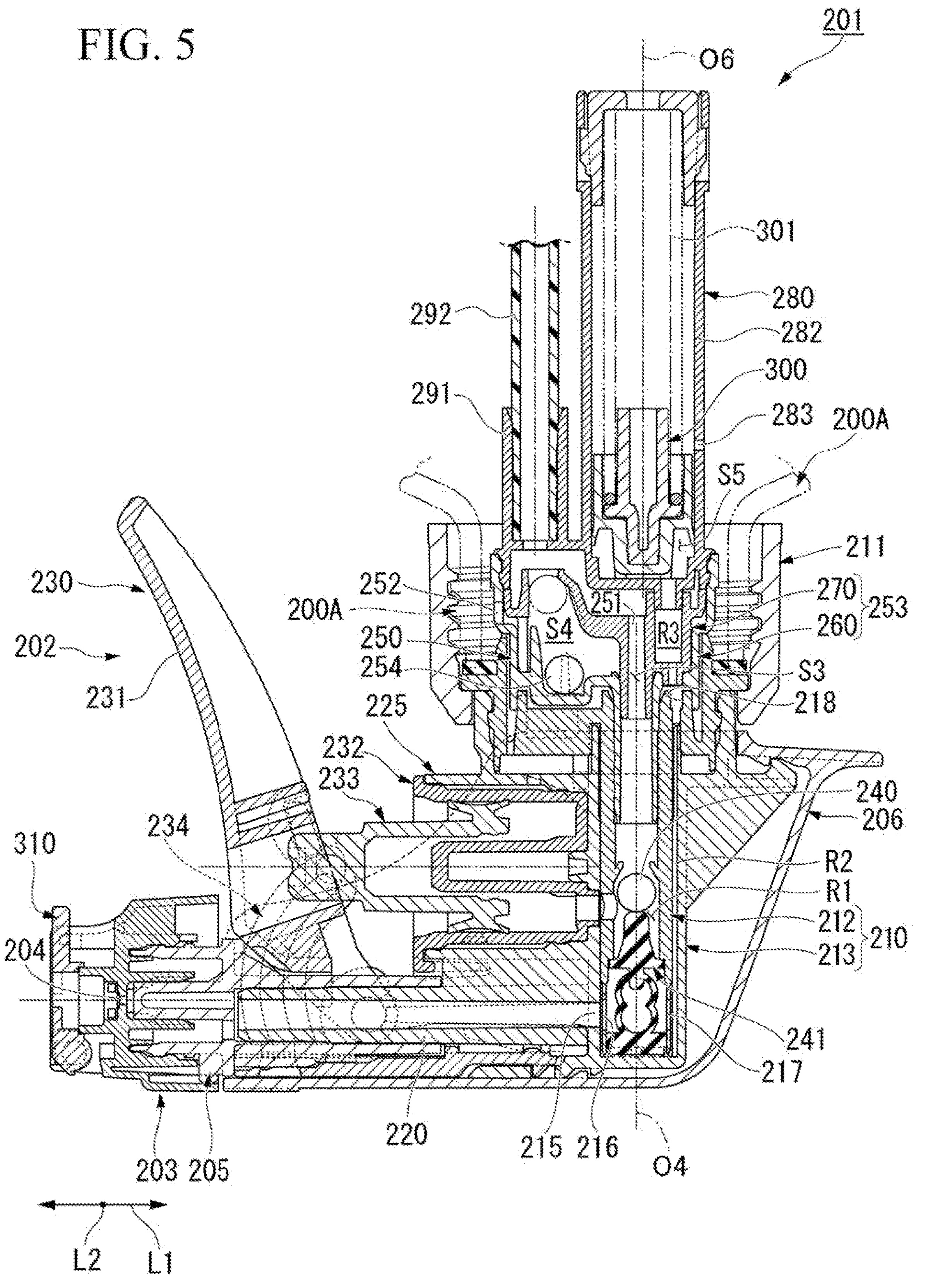
FIG. 5 is an enlarged cross-sectional view of surroundings of a mounting cap shown in FIG. 4.

The sprayer body 202 mainly includes a longitudinal supply cylinder part 210, a mounting cap 211, an injection cylinder part 220, a trigger mechanism 230, a ball valve 240, a storage valve 241, an invertible adapter 250, a storage cylinder 280, and a storage plunger 300. The sprayer body 202 of the embodiment can spray a liquid and can perform continuous spraying even in any posture in any case of the upright posture in which the container body 200A is uptight as shown in FIG. 4 (a posture in which the mouth part of the container body 200A is directed upward) and the inverted posture in which the container body 200A is inverted as shown in FIG. 5 (a posture in which the mouth part of the container body 200A is directed downward).

As shown in FIG. 4, in the embodiment, a center axis of the longitudinal supply cylinder part 210 is referred to as a first axis (axis) O4, the side of the container body 200A along the first axis O4 is referred to as a lower side, a side opposite thereto is referred to as an upper side, and a direction along the first axis O4 is referred to as an upward/downward direction. Further, in a plan view seen in the upward/downward direction, a direction crossing the first axis O4 is referred to as the forward/rearward direction L1, and a direction perpendicular to both the upward/downward direction and the forward/rearward direction L1 is referred to as the leftward/rightward direction L2. Further, in the embodiment, a center axis of the injection cylinder part 220 is referred to as a second axis (axis) O5. In the embodiment, the second axis O5 extends in the forward/rearward direction L1. Further, in the forward/rearward direction L1, a direction from the longitudinal supply cylinder part 210 toward the injection cylinder part is referred to as a forward direction, and a direction opposite thereto is referred to as a rearward direction.

(Longitudinal Supply Cylinder Part)

The longitudinal supply cylinder part 210 extends in the upward/downward direction and has a function of suctioning up the liquid in the container body 200A. The longitudinal supply cylinder part 210 is mounted on the container body 200A by the mounting cap 21L The Longitudinal supply cylinder part 210 includes an outer tube 212 having a cylindrical shape with a top, and an inner tube 213 fitted into the outer tube 212.

Figure 6:
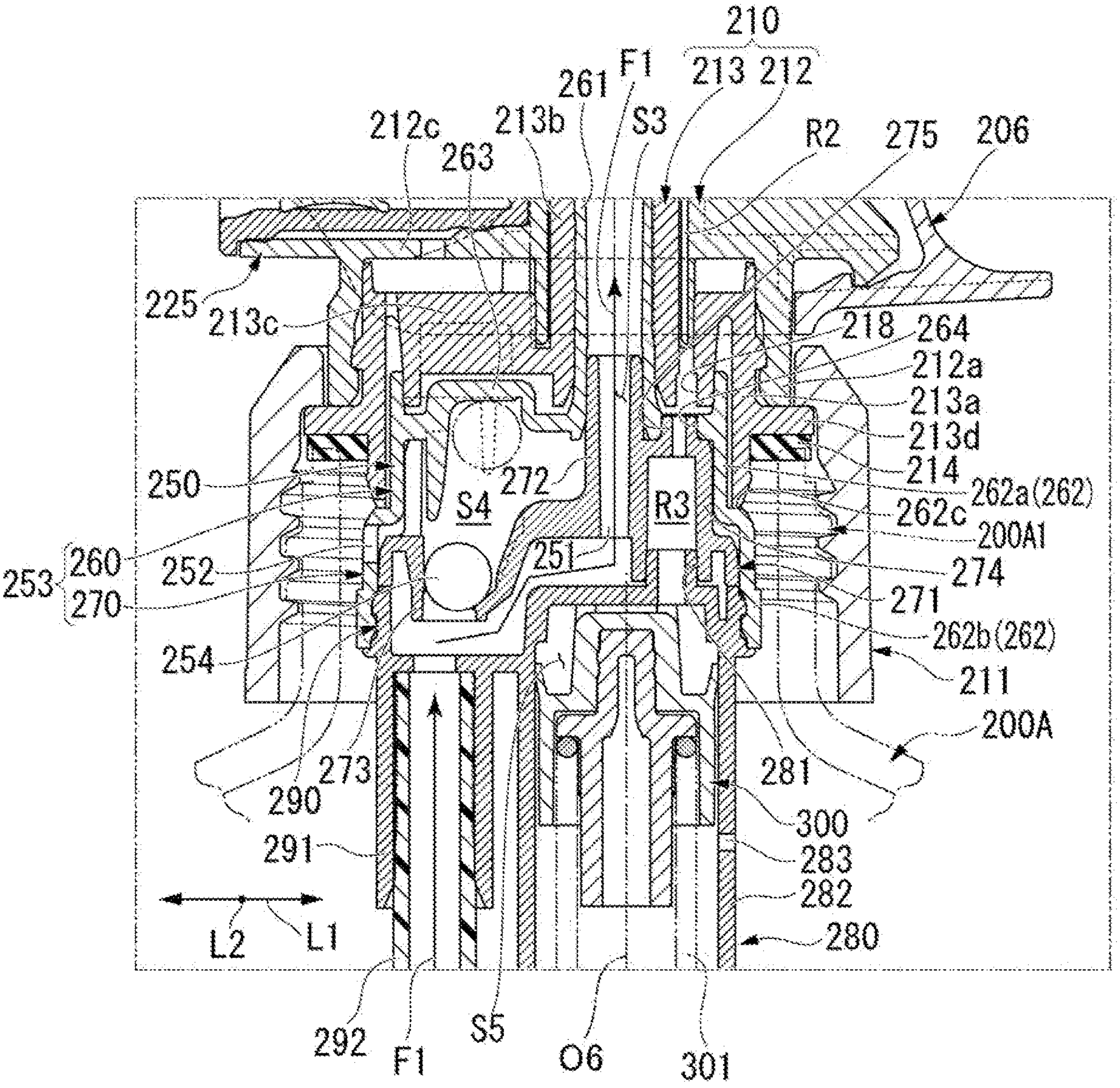
FIG. 6 is a longitudinal cross-sectional view of the trigger-type liquid sprayer in a state in which the container body shown in FIG. 4 is in an inverted posture.

As shown in FIG. 4 and FIG. 6, the outer tube 212 includes a large diameter portion 212*a*, a small diameter portion 212*b* disposed above the large diameter portion 212*a* and having an inner diameter and an outer diameter smaller than those of the large diameter portion 212*a*, and a flange portion 212*c* configured to connect an upper end of the large diameter portion 212*a* and a lower end of the small diameter portion 212*b*. An upper end opening of the small diameter portion 212*b* is closed by a top wall portion 212*d*. The inner tube 213 includes a large diameter portion (inner tube large diameter portion) 213*a*, a small diameter portion (inner tube small diameter portion) 213*b* disposed above the large diameter portion 213*a* and having an inner diameter and an outer diameter smaller than those of the large diameter portion 213*a*, and a flange portion (inner tube stepped portion) 213*c* configured to connect an upper portion of the large diameter portion 213*a* and a lower portion of the small diameter portion 213*b*. The flange portion 213*c* of the inner tube 213 is disposed below the flange portion 212*c* of the outer tube 212.

An annular brim portion 213*d* protruding outward in the radial direction is formed in a portion of the large diameter portion 213*a* of the inner tube 213 located below the large diameter portion 212*a* of the outer tube 212. The brim portion 213*d* is disposed on an upper end opening edge in a mouth part 200A 1 of the container body 200A via a packing 214, and sandwiched between the upper end opening edge of the mouth part 200A1 and the upper end opening edge in the upward/downward direction by the mounting cap 211 mounted in the mouth part 200A1 of the container body 200A through, for example, screwing. Accordingly, the entire sprayer body 202 is mounted on the mouth part of the container body 200A via the mounting cap 211.

An outer through-hole 215 passing through the small diameter portion 212*b* in the forward/rearward direction L1 is formed in a portion of the outer tube 212 in front of the upper end portion of the small diameter portion 212*b*. Further, an inner through-hole 216 passing through the small diameter portion 2131*b* in the forward/rearward direction L1 and located behind the outer through-hole 215 is formed in the upper end portion of the small diameter portion 213*b* of the inner tube 213. Further, a first fox wing hole 217 passing through the small diameter portion 213*b* in the forward/rearward direction L1 is formed in a portion of the upper end portion of the small diameter portion 213*b* of the inner tube 213 located behind the inner through-hole with the first axis O4 sandwiched therebetween.

The first axis O4 of the longitudinal supply cylinder part 210 configured as described above is disposed at a position close to a rear side than a container axis passing through a center of the mouth part 200A1 of the container body 200A in the upward/downward direction. Further, the longitudinal supply cylinder part 210 includes an internal flow path (first flow path) R1 through which a liquid flows toward the spray hole 204 of the nozzle part 203 through the injection cylinder part 220 and an external flow path (second flow path) R1 through which part of the liquid flowing through the internal flow path R1 flows toward the storage cylinder 280, according to rearward movement of a trigger part 231, which will be described below.

The internal flow path R1 becomes an internal space located inside the inner tube 213. The external flow path R2 is formed between the small diameter portion 212*b* of the outer tube 212 and the small diameter portion 213*b* of the inner tube 213. Specifically, the external flow path R2 is formed in a portion located behind the small diameter portion 212*b* between the small diameter portion 212*b* of the outer tube 212 and the small diameter portion 213*b* of the inner tube 213, and formed to extend in the upward/downward direction. The external flow path R2 is in communication with the internal flow path R1 through the first flowing hole 217 formed in the inner tube 213. Further, the external flow path R2 is in communication with a second flowing hole 218 formed to pass through the flange portion 213*c* of the inner tube 213 in the upward/downward direction.

(Injection Cylinder Part)

As shown in FIG. 4, the injection cylinder part 220 extending forward along the second axis O5 is connected to an upper end portion of the longitudinal supply cylinder part 210 configured as described above. The injection cylinder part 220 is formed in a cylindrical shape having a forward opening part that opens toward the front of the sprayer body 202, and is in communication with a portion of the internal flow path R1 of the longitudinal supply cylinder part 210 located above the ball valve 240, which will be described below, through the outer through-hole 215 and the inner through-hole 216.

A tube portion for a cylinder 225 is provided below the injection cylinder part and above the mounting cap 211. The tube portion for a cylinder 225 protrudes forward from the longitudinal supply cylinder part 210 and opens forward.

(Trigger Mechanism)

The trigger mechanism 230 includes the trigger part 231, a main cylinder 232, and a main piston 233. The trigger mechanism 230 can cause the liquid to flow from the inside of the internal flow path R1 of the longitudinal supply cylinder part 210 toward the spray hole 204 through the inside of the injection cylinder part 220 due to rearward swinging of the trigger part 231.

The main cylinder 232 is fitted into the tube portion for a cylinder 225. The main cylinder 232 is formed in a bottomed tubular shape that opens forward and that is closed from the rear, and is in communication with a portion of the internal flow path R1 of the longitudinal supply cylinder part 210 located above the ball valve 240, which will be described below.

The trigger part 231 is disposed in front of the longitudinal supply cylinder part to be movable rearward in a forward biased state. The trigger part 231 is formed to extend in the upward/downward direction, and disposed below the injection cylinder part 220. The trigger part 231 has an upper end portion axially supported by the injection cylinder part 220 to be swingable in the forward/rearward direction L1, and a lower end portion disposed in front of the main cylinder 232.

The main piston 233 is disposed in the main cylinder 232 to be movable in the forward/rearward direction L1. The main piston 233 is movable in the forward/rearward direction L1 in conjunction with the swinging of the trigger part 231. Accordingly, the inside of the main cylinder 232 is compressed and decompressed according to movement of the main piston 233 in the forward/rearward direction L1. Further, the main piston 233 is formed in a cylindrical shape with a top, the rear of which is open and the front of which is closed.

The main piston 233 is biased forward together with the trigger part 231 by an elastic recovering force (biasing force) of an elastic plate 234. The main piston 233 is moved rearward and fitted into the main cylinder 232 according to the rearward swinging of the trigger part 231. Further, the main piston 233 is located at the foremost position according thereto when the trigger part 231 is located at the foremost swing position. Further, the elastic plate 234 is disposed between the injection cylinder part 220 and the trigger part 231 and biases the trigger part 231 forward.

(Ball Valve, Storage Valve)

The ball valve 240 and the storage valve 241 are provided in the small diameter portion 213*b* of the inner tube 213 of the longitudinal supply cylinder part 210. The ball valve 240 is a check valve configured to block communication between the inside of the container body 200A and the inside of the main cylinder 232 through the inside of the internal flow path R1 upon compression in the main cylinder 232, and allow communication between the inside of the container body 200A and the inside of the main cylinder 232 through the inside of the inner tube 213 by being displaced upward upon decompression of the inside of the main cylinder 232.

The storage valve 241 is disposed above the ball valve 240. The storage valve is disposed inside the upper end portion of the small diameter portion 213*b* of the inner tube 213. The storage valve 241 is a check valve configured to allow supply of the liquid into the injection cylinder part 220 and the external flow path R2 from the inside of the internal flow path R1, and restrict a counterflow of the liquid from the inside of the external flow path R2 toward the inside of the main cylinder 232. Further, the storage valve 241 has a function of restricting the liquid (and external air) that enters the inside of the main cylinder 232 from the side of the injection cylinder part 220 when the inside of the main cylinder 232 is decompressed. Further, the storage valve 241 is not limited to only those having the function of the check valve described above. The storage valve 241 may employ, for example, an accumulator valve that is opened when a pressure in a portion of the internal flow path R1 located above the ball valve 240 reaches a predetermined pressure, and configured to allow supply of the compressed liquid into the injection cylinder part 220 and the external flow path R2 from the inside of the internal flow path R1.

(Invertible Adaptor)

As shown in FIG. 4 and FIG. 6, the invertible adapter 250 is disposed inside the mounting cap 211, disposed below the longitudinal supply cylinder part 210 along the first axis O4, and connected to the inner tube 213 in the longitudinal supply cylinder part 210. Accordingly, the invertible adapter 250 is disposed inside the mounting cap 211 while being assembled integrally with a lower side of the longitudinal supply cylinder part 210.

The invertible adapter 250 is an adapter configured to spray the liquid in the container body 200A even when the container body 200A is in any one of the upright posture and the inverted posture. The invertible adapter 250 includes an adapter main body 253 configured to define a first space S3 that brings the inside of the container body 200A in communication with the inside of the internal flow path R1 of the inner tube 213 through an upright introduction port 251 and a second space S4 that brings the inside of the container body 200A in communication with the first space S3 through an inverted introduction port 252, and a ball valve (switching valve) 254 configured to, in a state in which the sprayer body 202 is mounted on the container body 200A, block communication between the first space S3 and the second space S4 when the container body 200A is upright and bring the first space S3 in communication with the second space S4 when the container body 200A is inverted.

Detailed description will be performed. As shown in FIG. 6, the adapter main body 253 includes a first adapter 260 and a second adapter 270, which are assembled in the upward/downward direction. The first adapter 260 includes a first tube portion (fitting cylinder part) 261 disposed above the second adapter 270 and inside the small diameter portion 213*b* of the inner tube 213, a second tube portion 262 disposed inside the large diameter portion 213*a* of the inner tube 213, and a connecting wall portion (first flange) 263 configured to connect the first tube portion 261 and the second tube portion 262.

The first tube portion 261 is disposed coaxially with the first axis O4 and formed in a cylindrical shape that opens both upward and downward. The upper end portion of the first tube portion 261 is fitted into the small diameter portion 213*b* of the inner tube 213. Accordingly, the first adapter 260 is assembled integrally with the longitudinal supply cylinder part 210. Further, the inside of the first tube portion 261 is in communication with the inside of the internal flow path R1 of the inner tube 213. A lower end portion of the first tube portion 261 is located below a lower end portion of the small diameter portion 213*b* of the inner tube 213 and located below the connecting wall portion 263.

The connecting wall portion 263 connects an outer circumferential surface of the first tube portion 261 and an inner circumferential surface of the second tube portion 262 in the radial direction. The connecting wall portion 263 is disposed below the flange portion 213*c* of the inner tube 213 to face it in upward/downward direction with a gap. A connecting hole 264 passing through the connecting wall portion 263 in the upward/downward direction is formed a portion of the connecting wall portion 263 located behind the first tube portion 261.

The second tube portion 262 includes an upper tube portion 262*a* disposed inside the large diameter portion 213*a* of the inner tube 213, and a lower tube portion 262*b* continuous with the lower end portion of the upper tube portion 262*a*, having a larger diameter than the upper tube portion 262*a*, and formed to extend downward from the lower end portion of the upper tube portion 262*a*. Accordingly, the second tube portion 262 is formed in a two-stepped tube shape having different outer diameters. A connecting portion between the upper tube portion 262*a* and the lower tube portion 262*b* has an annular stepped portion 262*c* that opens upward. The stepped portion 262*c* comes into contact with the lower end portion of the large diameter portion 213*a* of the inner tube 213 from below. The lower tube portion 262*b* is disposed below the large diameter portion 213*a* of the inner tube 213.

The lower tube portion 262*b* has an outer diameter smaller than an inner diameter of the mouth part of the container body 200A. Accordingly, a predetermined gap is secured between the outer circumferential surface of the lower tube portion 262*b* and the inner circumferential surface of the mouth part of the container body 200A. Further, the inverted introduction port 252 passing through the first tube portion 261 in the radial direction is formed in a portion of the lower tube portion 262*b* located in front of the first tube portion 261. Accordingly, the liquid in the container body 200A can be introduced into the first adapter 260 through the inverted introduction port 252.

The second adapter 270 includes a seal tube portion 271 having a cylindrical shape with a top and fitted into the lower tube portion 262*b* of the first adapter 260, and a first communication tube portion 272, a second communication tube portion 273 and a relay tube portion 274, which are formed integrally with a top wall of the seal tube portion 271.

The first communication tube portion 272 is formed in a cylindrical shape passing through the top wall of the seal tube portion 271 in the upward/downward direction and disposed coaxially with the first axis O4. The upper end portion of the first communication tube portion 272 is fitted into the first tube portion 261 of the first adapter 260. Accordingly, the first adapter 260 and the second adapter 270 are assembled in the upward/downward direction. Further, the entire invertible adapter 250 is assembled integrally with the longitudinal supply cylinder part 210.

Further, the inside of the first communication tube portion 272 is in communication with the inside of the internal flow path R1 of the inner tube 213 through the first tube portion 261 of the first adapter 260. Then, a downward opening part of the first communication tube portion 272 functions as the upright introduction port 251. Further, the inside of the first communication tube portion 272 functions as the first space S3 configured to bring the inside of the container body 200A in communication with the inside of the internal flow path R1 through the upright introduction port 251.

The second communication tube portion 273 is formed in a portion of the top wall of the seal tube portion 271 located in front of the first communication tube portion and formed in a cylindrical shape passing through the top wall in the upward/downward direction. The second communication tube portion 273 has a diameter that is gradually reduced downward. A space defined between the second communication tube portion 273, the first communication tube portion 272 and the first adapter 260 functions as the second space S4 (a so-called valve chamber) in communication with the container body 200A through the inverted introduction port 252. The ball valve 254 is accommodated in the second space S4.

The ball valve 254 is releasably seated on the lower end opening edge of the second communication tube portion 273 and opens and closes the lower end opening of the second communication tube portion 273. Specifically, the ball valve 254 blocks communication between the first space S3 and the second space S4 by closing the lower end opening of the second communication tube portion 273 (closing a valve) when the container body 200A is in the upright posture. Further, the ball valve 254 opens the lower end opening (closes a valve) and brings the first space S3 in communication with the second space S4 by being separated from the lower end opening edge of the second communication tube portion 273 when the container body 200A is in the inverted posture (see FIG. 5).

The relay tube portion 274 is formed in a portion of the top wall of the seal tube portion 271 located behind the first communication tube portion 272, and formed in a cylindrical shape with a top passing through the top wall of the seal tube portion 271 in the upward/downward direction. In the example shown, the relay tube portion 274 is disposed to be arranged with the first communication tube portion 272 behind the first communication tube portion 272. Apart of a circumferential wall of the relay tube portion 274 is formed integrally with the first communication tube portion 272.

The circumferential wall of the relay tube portion 274 is formed to extend downward from the upright introduction port 251. Then, the storage cylinder 280 is assembled to the lower end portion of the circumferential wall of the relay tube portion 274. Accordingly, the internal space of the relay tube portion 274 is separated from the upright introduction port 251 and the first space S3. A connecting tube 275 fitted into the connecting hole 264 formed in the connecting wall portion 263 of the first adapter is formed in the top wall of the relay tube portion 274. Accordingly, the internal space of the relay tube portion 274 functions as a relay flow path R3 configured to come into communication with the inside of the external flow path R2 through the second flowing hole 218 and come into communication with the side of the storage cylinder 280.

(Storage Cylinder, Storage Plunger)

As shown in FIG. 4 and FIG. 6, the storage cylinder 280 is disposed inside the mounting cap 211, disposed below the invertible adapter 250 along the first axis O4 and connected to the invertible adapter 250. Accordingly, the storage cylinder 280 is disposed inside the mounting cap 211 while being assembled integrally with a lower side of the invertible adapter 250.

The storage cylinder 280 of the embodiment is formed integrally with a closing tube portion 290 formed in a bottomed tubular shape and configured to close the lower tube portion 262*b* of the second adapter 270 of the invertible adapter 250 from below. The closing tube portion 290 is press-fitted into the lower end portion of the lower tube portion 262*b*. Accordingly, the lower tube portion 262*b* of the second adapter 270 is closed from below. Further, a fixing tube portion 291 extending downward is formed integrally with a portion of the bottom wall of the closing tube portion 290 located in front thereof. The fixing tube portion 291 is formed in a cylindrical shape extending in the upward/downward direction and opening both upward and downward.

An upper end portion of a pipe 292, a lower end opening (not shown) of which is located in the container body 200A, is fitted into the lower end portion of the fixing tube portion 291. Accordingly, the upright introduction port 251 can come into communication with the inside of the container body 200A through the fixing tube portion 291 and the pipe 292. For this reason, the liquid in the container body A can be introduced into the upright introduction port 251 when the container body A is upright.

The storage cylinder 280 is formed integrally with the portion of the bottom wall of the closing tube portion 290 located behind the fixing tube portion 291. Accordingly, the fixing tube portion 291 and the storage cylinder are disposed inside the mounting cap while being arranged parallelly in the forward/rearward direction L1. Further, the storage cylinder 280 is disposed such that a third axis (axis) O6 that is a center axis of the storage cylinder 280 is slightly shifted rearward from the first axis O4. However, it is not limited to this case. For example, the storage cylinder 280 may be formed such that the first axis O4 and the third axis O6 are arranged coaxially.

The storage cylinder 280 is formed in a cylindrical shape with a top that opens downward, and an upper wall portion is disposed to approach the lower end portion of the relay tube portion 274 of the invertible adapter 250. A supply tube portion 281 press-fitted into the relay tube portion 274 is formed in the upper wall portion of the storage cylinder 280. Accordingly, the inside of the storage cylinder 280 is in communication with the inside of the relay tube portion 274 (the relay flow path R3) through the supply tube portion 281. Accordingly, the liquid passing through the relay flow path R3 can be supplied into the storage cylinder 280 (a storage space S5, which will be described below) according to rearward swinging, of the trigger part 231.

The storage plunger 300 is disposed in the storage cylinder 280 to be movable along the third axis O6 in the upward/downward direction. Accordingly, the storage plunger 300 tightly slides in the storage cylinder 280 in the upward/downward direction. The storage plunger 300 moves downward according to supply of the liquid into the storage cylinder 280. Further, a space of the storage cylinder 280 located above the storage plunger 300 functions as the storage space S5.

Part of the liquid passing through the internal flow path R1 of the inner tube 213 is supplied through the first flowing hole 217, the external flow path R2, the second flowing hole 218 and the relay flow path R3 and stored in the storage space S5. The storage space S5 expands as the storage plunger 300 moves downward due to the supply of the liquid.

An biasing member (for example, a coil spring) 301 is disposed in a portion of the storage cylinder 280 located below the storage plunger 300. The biasing member biases the storage plunger 300 upward. The biasing member 301 biases the storage plunger 300 upward in an initial state before the trigger part 231 is operated. Accordingly, the storage plunger 300 is located at the most elevated position.

Further, the biasing member 301 is a metal coil spring disposed coaxially with the third axis O6. However, for example, a resin spring may be used as the biasing member 301, and another member having elasticity may be used.

Further, a recovery hole 283 passing through the cylinder wall 282 in the radial direction is formed in a portion of a cylinder wall 282 of the storage cylinder 280 located below the storage plunger 300 when located at the most elevated position. Accordingly, the inside of the storage cylinder 280 is in communication with the inside of the container body 200A through the recovery hole 283.

(Relay Member)

As shown in FIG. 4, the relay member 205 is disposed in front of the sprayer body 202 configured as above. The relay member 205 protrudes forward from the sprayer body 202 by being mounted in the injection cylinder part 220. The relay member 205 includes a partition wall 205*a* configured to cover a forward opening pail of the injection cylinder part 220 from the front, an outer fitting tube portion 205*b* extending rearward from the partition wall 205*a* and fitted onto the injection cylinder part 220, and a mounting tube portion 205*c*, in which the nozzle part 203 is mounted, extending forward from the partition wall 205*a*. Further, a communication hole 205*e* in communication with the inside of the injection cylinder part 220 is formed in the partition wall 205*a*.

(Nozzle Part)

The nozzle part (nozzle member) 203 is mounted on the sprayer body 202 via the relay member 205. Specifically, the nozzle part 203 is assembled to the relay member 205 by being mounted on the mounting tube portion 205*c*. Further, the nozzle part 203 is disposed in front of the sprayer body 202 and protrudes forward from the relay member 205. The nozzle part 203 is formed in a cylindrical shape with a top that opens rearward. The spray hole 204 passing through the front wall portion in the forward/rearward direction L1 is formed in the front wall portion of the nozzle part 203. Further, a lid part 310 configured to openably close the spray hole 204 from the front is connected to a front wall portion of the nozzle part 203 via a hinge portion. The lid part is able to open and close the spray hole 204 as the lid part 310 is pivoted about the hinge portion.

(Cover Body)

The cover body 206 is formed to cover the longitudinal supply cylinder part 210, the injection cylinder part 220, the main cylinder 232, and the like, from above, behind and in the leftward/rightward direction L2, and attached to the outer tube 212 or the like of the longitudinal supply cylinder part 210.

(Action of Trigger-Type Liquid Sprayer)

Next, a case in which the trigger-type liquid sprayer 201 configured as above is used will be described. Further, it is assumed that each part of the trigger-type liquid sprayer 201 is filled with a liquid by operating the trigger part 231 multiple times.

(Spray Operation in Upright Posture)

A spray operation in an upright posture will be described. Further, in the case of the upright posture, as shown in FIG. 4 and FIG. 6, the ball valve 254 of the invertible adapter 250 is seated at the lower end opening edge of the second communication tube portion 273. Accordingly, communication between the first space S3 and the second space S4 is blocked by the ball valve 254.

In the upright posture of the container body 200A, when the trigger part 231 is operated to be pulled rearward against the biasing force of the elastic plate 234, the main piston 233 is moved rearward from the foremost position, and the inside of the main cylinder 232 is compressed. Accordingly, the liquid in the main cylinder 232 is supplied into the inner tube 213 of the longitudinal supply cylinder part 210, i.e., into the internal flow path R1. Specifically, the liquid in the main cylinder 232 is supplied to a portion of the internal flow path R1 located above the ball valve 240. Accordingly, the supplied liquid pushes the ball valve 240 downward and pushes the storage valve 241 upward.

For this reason, the liquid in the internal flow path R1 can flow toward the spray hole 204 of the nozzle part 203 through the injection cylinder part 220. Accordingly, the liquid can be sprayed forward from the spray hole 204. Further, part of the liquid flowing through the internal flow path R1 can be supplied toward the external flow path R2 through the first flowing hole 217. Accordingly, the liquid supplied into the external flow path R2 can be supplied to the storage space S5 of the storage cylinder 280 through the second flowing hole 218 and the relay flow path R3, and the storage space S5 can be compressed. For this reason, the storage plunger 300 can be moved downward from the most elevated position against the biasing force of the biasing member 301 according to the compression of the storage space S5, and the liquid can be stored (filled) in the storage space S5. Accordingly, whenever the trigger part 231 is operated to be pulled rearward, the liquid can be stored in the storage space S5 of the storage plunger 300 while the liquid is sprayed from the spray hole 204.

After filling of the storage space S5 with the liquid, when the trigger part 231 is released, the trigger part 231 can be recovered forward by the elastic recovering force (biasing force) of the elastic plate 234. Further, since the main piston 233 is recovered forward through the main cylinder 232 according to the recovery movement of the trigger part 231, the inside of the main cylinder 232 can be decompressed to a pressure lower than that in the container body 200A. For this reason, the ball valve 240 can be raised in a state in which the storage valve 241 is closed.

Then, as the ball valve 240 is raised, it is possible to crease a negative pressure in the first space S3. Here, as described earlier, communication between the inside of the first space S3 and the inside of the second space S4 is blocked by the ball valve 254. For this reason, by creating a negative pressure in the first space S3, like an arrow F1 shown in FIG. 6, the liquid in the container body 200A can be suctioned up into the internal flow path R1 through the pipe 292, the upright introduction port 251 and the first space S3, and can be introduced into the main cylinder 232. Accordingly, it is possible to prepare the next spray.

Further, when a rearward operation of the trigger part 231 is stopped, supply of the liquid to the storage space S5 through the external flow path R2 is stopped, and upward recovery movement of the storage plunger 300 toward the most elevated position by the biasing force of the biasing member 301 is started. Accordingly, the liquid stored in the storage space S5 can be introduced into the injection cylinder part 220 through the relay flow path R3 and the external flow path R2 and can be guided to the spray hole 204. Accordingly the liquid can be continuously sprayed through the spray hole 204. Further, when the liquid can be introduced from the external flow path R2 toward the injection cylinder part 220, the storage valve 241 is closed. For this reason, the liquid can be smoothly guided toward the spray hole 204 through the injection cylinder pail 220 without counter flowing through the internal flow path R1.

In this way, the liquid can be sprayed not only when the trigger pail 231 is pulled rearward but also when the trigger part 231 is not operated, and a continuous spraying of the liquid can be performed.

(Spray Operation in Inverted Posture)

Next, a spray operation in an inverted posture will be described. Further, in the case of the inverted posture, as shown in FIG. 5 and FIG. 4, the ball valve 254 of the invertible adapter 250 is separated from the lower end opening edge of the second communication tube portion 273. Accordingly, communication between the first space S3 and the second space S4 is allowed.

Even when the liquid is sprayed in the inverted posture of the container body 200A, like the case of the above-mentioned upright posture, the trigger part 231 is operated to be pulled rearward against the biasing force of the elastic plate 234. Accordingly, continuous spraying of the liquid can be performed by the same action as in the case of the above-mentioned upright posture.

Figure 7:
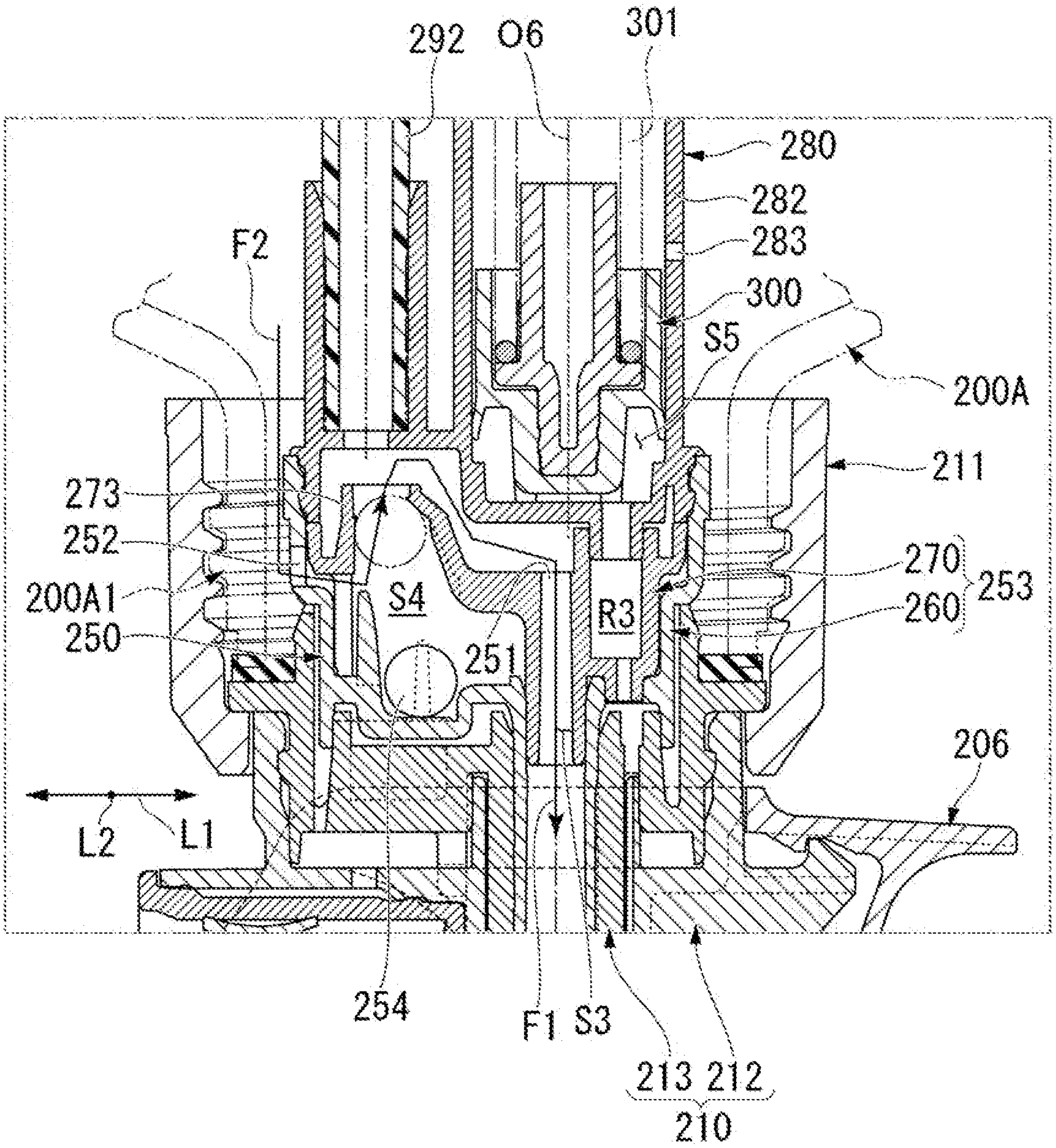
FIG. 7 is an enlarged cross-sectional view of surroundings of the mounting cap shown in FIG. 6.

Further, when the trigger part 231 in the inverted posture of the container body 200A is recovered forward, communication between the first space S3 and the second space S4 is allowed. Accordingly, the liquid in the container body 200A can be suctioned up into the second space S4 through the inverted introduction port 252 by the negative pressure in the main cylinder 232 and the first space S3 like an arrow F2 shown in FIG. 7. For this reason, the liquid can be suctioned up into the internal flow path R1 from the second space S4 through the first space S3 and can be introduced into the main cylinder 232. Accordingly, it is possible to prepare the next spray.

As described above, according to the trigger-type liquid sprayer 201 of the embodiment, the liquid can be sprayed not only when the trigger part 231 is operated to be pulled rearward but also when the trigger part 231 is not operated, and continuous spraying of the liquid can be performed. Further, continuous spraying of the liquid can be performed even in a state in which the container body 200A is in any one of the upright posture and the inverted posture.

In particular, in the trigger-type liquid sprayer 201 of the embodiment, as shown in FIG. 4, the invertible adapter 250 is connected to the longitudinal supply cylinder part while being disposed therebelow, and the storage cylinder 280 is connected to the invertible adapter 250 while being disposed therebelow. For this reason, the longitudinal supply cylinder part 210, the invertible adapter 250 and the storage cylinder are disposed along the first axis O4 above and below in series. Accordingly, an increase in size of a cap diameter of the mounting cap 211 can be suppressed while both the invertible adapter 250 and the storage cylinder 280 are disposed inside the mounting cap 211. For this reason, reduction in size of the trigger-type liquid sprayer 201 can be easily achieved, and for example, operability when the trigger part 231 is operated while gripping the container body 200A can be improved.

Further, according to the trigger-type liquid sprayer 201 of the embodiment, the outer tube 212 and the inner tube 213 constitute the longitudinal supply cylinder part 210 in a double tubular shape. For this reason, since the internal flow path (first flow path) R1 and the external flow path (second flow path) R2 can be simply formed and each flow path can be formed while being appropriately divided, simplification of the configuration is easily achieved.

Further, according to the trigger-type liquid sprayer 201 of the embodiment, the recovery hole 283 is formed in the cylinder wall 282 of the storage cylinder 280. For this reason, for example, the liquid entering the storage cylinder 280 can be discharged through the recovery hole 283 upon inversion of the container body 200A. Further, after the container body 200A is inverted, when returning to the upright, even if the liquid is remaining in the storage cylinder 280, the air in the container body 200A can be introduced through the recovery hole 283, and the liquid remained using air substitution can be discharged into the container body 200A through the lower end opening part of the storage cylinder 280. In this way, it is possible to prevent the liquid from being accumulated in the storage cylinder 280, and it is easy to move the storage plunger 300 smoothly.

Hereinabove, while the embodiments of the present invention have been described, these embodiments are presented as examples and are not intended to limit the scope of the invention. The embodiments can be implemented in various other forms, and various omissions, substitutions, and changes can be made without departing from the spirit of the present invention. The embodiments and variants thereof include, for example, those that can be easily assumed by a person skilled in the art, those that are substantially the same, and those that are equivalent.

For example, in the embodiment, while the case where the nozzle part 203 is provided with the lid part 310 via the hinge portion has been described as an example, the lid part 310 is not essential and the lid part 310 may not be provided. Further, in the embodiment, when spraying the liquid from the spray hole 204, it may be configured to spray in various spray aspects, such as linear, mist, or the like. Furthermore, an accumulator valve may be provided in the nozzle part 203 to spray the liquid in a compressed state.

INDUSTRIAL APPLICABILITY

According to the present invention, it is possible to provide a trigger-type liquid sprayer that enables continuous spraying in both an upright posture and an inverted posture, and further, a trigger-type liquid sprayer that enables continuous spraying in both an upright posture and an inverted posture while suppressing an increase in size of a cap diameter of a mounting cap.

REFERENCE SIGNS LIST

1, 201 Trigger-type liquid sprayer
2, 202 Ejector main body
3, 204 Injection hole
4, 203 Nozzle member (nozzle part)
7, 250 Invertible adaptor
8, 253 Adaptor main body
10, 210 Longitudinal supply cylinder part
11, 211 Mounting cap
16, 230 Trigger mechanism
21, 212 Outer tube
22, 213 Inner tube
22*a*, 213*b* Inner tube small diameter portion (first fitting cylinder part, small diameter portion)
22*b*, 213*c* Inner tube stepped portion (first facing wall, flange portion)
22*c*, 213*a* Inner tube large diameter portion (large diameter portion)
31, 280 Storage cylinder
32, 300 Storage plunger
40, 231 Trigger part
110*a*, 261 Fitting cylinder part (second fitting cylinder part, first tube portion)
115, 263 First flange (second facing wall, connecting wall portion)
118, 252 Inverted introduction port
125, S4 Valve chamber (second space)
126, 254 Ball valve (switching valve)
127, S3 First space
131*a*, 251 Upright introduction port (upper end opening part)
283 Recovery hole
A, 200A Container body
A1, 200A1 Mouth part
O Axis (center axis of longitudinal supply cylinder part)
O1 Axis (center axis of storage cylinder)
O2 Axis (center axis of injection cylinder part)
O3 Axis (pump axis)
O4 Axis (center axis of longitudinal supply cylinder part, first axis)
O5 Axis (center axis of injection cylinder part, second axis)
O6 Axis (center axis of storage cylinder, third axis)
R1 Internal flow path (first flow path)
R2 External flow path (second flow path)
R3 Relay flow path
S1 Collecting space
S2 Merging space
S5 Storage space

The invention claimed is:

1. A trigger-type liquid sprayer comprising:

a sprayer body configured to be mounted on a container body;

a nozzle member provided in front of the sprayer body and having a spray hole configured to spray a liquid forward; and an invertible adapter attached to a lower end portion of the sprayer body, wherein the sprayer body includes:

a longitudinal supply cylinder part extending in an upward/downward direction, through which a liquid suctioned up from an inside of the container body flows;

a trigger mechanism having a trigger part disposed in front of the longitudinal supply cylinder part to be movable rearward in a forward biased state, and configured to cause a liquid to flow toward the spray hole according to rearward movement of the trigger part;

a storage cylinder extending in a forward/rearward direction, into which a liquid is supplied according to rearward movement of the trigger part; and a storage plunger configured to be movable rearward through the storage cylinder in a forward biased state according to supply of the liquid into the storage cylinder, and configured to cause the liquid in the storage cylinder to flow toward the spray hole, the invertible adapter includes:

an adapter main body configured to form a first space and a second space, the first space configured to bring the container body in communication with an inside of the longitudinal supply cylinder part through an upright introduction port, and the second space configured to bring the inside of the container body in communication with the first space through an inverted introduction port; and a changeover valve configured to, in a state that the sprayer body is mounted on the container body, block communication between the first space and the second space when the container body is upright and bring the first space and the second space in communication with each other when the container body is inverted, the longitudinal supply cylinder part includes:

an outer tube, and an inner tube fitted into the outer tube, and a storage valve is fitted into the inner tube at an upper end of the inner tube.

2. The trigger-type liquid sprayer according to claim 1, wherein the storage cylinder and the storage plunger are provided above the longitudinal supply cylinder part and between the longitudinal supply cylinder part and the nozzle member.

3. The trigger-type liquid sprayer according to claim 1, wherein the longitudinal supply cylinder part includes:

a first facing wall disposed above the adapter main body; and a first fitting cylinder part passing through the first facing wall in the upward/downward direction, the adapter main body includes:

a second fitting cylinder part fitted into the first fitting cylinder part to a portion of the first fitting cylinder part located above the first facing wall through a lower end opening part of the first fitting cylinder part; and a second facing wall overhanging outward in a radial direction crossing the upward/downward direction from a portion of the second fitting cylinder part located below the first fitting cylinder part, and facing the first facing wall in the upward/downward direction, and an escaping portion is formed in a portion of an upper surface of the second facing wall located outside the first fitting cylinder part in the radial direction, the escaping portion being a flat surface or being recessed downward.

4. A trigger-type liquid sprayer comprising:

a sprayer body mounted on a mouth part of a container body, in which a liquid is accommodated, via a mounting cap; and a nozzle part mounted on the sprayer body and having a spray hole configured to spray a liquid, wherein the sprayer body includes:

a longitudinal supply cylinder part configured to suction up the liquid in the container body;

a trigger mechanism having a trigger part disposed to be movable rearward in a forward biased state, and configured to cause the liquid to flow from an inside of the longitudinal supply cylinder part toward the spray hole according to rearward movement of the trigger part;

an invertible adapter disposed inside the mounting cap, disposed below the longitudinal supply cylinder part along an axis of the longitudinal supply cylinder part, and connected to the longitudinal supply cylinder part;

a storage cylinder disposed inside the mounting cap, disposed below the invertible adapter along the axis, connected to the invertible adapter, and extending in an upward/downward direction; and a storage plunger provided in the storage cylinder to be movable downward in an upward biased state, the longitudinal supply cylinder part includes:

a first flow path through which a liquid flows toward the spray hole according to rearward movement of the trigger part; and a second flow path through which part of the liquid flowing through the first flow path flows toward the storage cylinder, and the invertible adapter includes:

an adapter main body configured to define a first space and a second space, the first space configured to bring an inside of the container body in communication with an inside of the first flow path through an upright introduction port, and the second space configured to bring an inside of the container body in communication with the first space through an inverted introduction port;

a switching valve configured to, in a state in which the sprayer body is mounted on the container body, block communication between the first space and the second space when the container body is upright and bring the first space and the second space in communication with each other when the container body is inverted; and a relay flow path configured to bring the second flow path and an inside of the storage cylinder in contact with each other.

5. The trigger-type liquid sprayer according to claim 4, wherein the longitudinal supply cylinder part includes:

an outer tube mounted on a mouth part of the container body via the mounting cap; and an inner tube fitted into the outer tube, the first flow path is formed inside the inner tube, and the second flow path is formed between the inner tube and the outer tube.

6. The trigger-type liquid sprayer according to claim 4, wherein the storage cylinder is formed in a cylindrical shape with a top that opens downward, the storage plunger is moved downward from a most elevated position by the liquid supplied into the storage cylinder according to rearward movement of the trigger part, and a recovery hole is formed in a portion of a cylinder wall of the storage cylinder located below the storage plunger when the storage plunger is located at the most elevated position, the recovery hole being configured to bring the inside of the storage cylinder in communication with the inside of the container body.

7. The trigger-type liquid sprayer according to claim 2, wherein the longitudinal supply cylinder part includes:

a first facing wall disposed above the adapter main body; and a first fitting cylinder part passing through the first facing wall in the upward/downward direction, the adapter main body includes:

a second fitting cylinder part fitted into the first fitting cylinder part to a portion of the first fitting cylinder part located above the first facing wall through a lower end opening part of the first fitting cylinder part; and a second facing wall overhanging outward in a radial direction crossing the upward/downward direction from a portion of the second fitting cylinder part located below the first fitting cylinder part, and facing the first facing wall in the upward/downward direction, and an escaping portion is formed in a portion of an upper surface of the second facing wall located outside the first fitting cylinder part in the radial direction, the escaping portion being a flat surface or being recessed downward.

8. The trigger-type liquid sprayer according to claim 5, wherein the storage cylinder is formed in a cylindrical shape with a top that opens downward, the storage plunger is moved downward from a most elevated position by the liquid supplied into the storage cylinder according to rearward movement of the trigger part, and a recovery hole is formed in a portion of a cylinder wall of the storage cylinder located below the storage plunger when the storage plunger is located at the most elevated position, the recovery hole being configured to bring the inside of the storage cylinder in communication with the inside of the container body.

* * * * *